US007844035B2

(12) United States Patent
Pietrowicz

(10) Patent No.: US 7,844,035 B2
(45) Date of Patent: Nov. 30, 2010

(54) DIAL-OUT VOICE NOTIFICATION SYSTEM

(76) Inventor: Stanley Pietrowicz, 65 Country View Dr., Freehold, NJ (US) 07728

( * ) Notice: Subject to any disclaimer, the term of this patent is extended or adjusted under 35 U.S.C. 154(b) by 0 days.

(21) Appl. No.: 10/913,572

(22) Filed: Aug. 6, 2004

(65) Prior Publication Data
US 2005/0031095 A1 Feb. 10, 2005

Related U.S. Application Data

(60) Provisional application No. 60/493,216, filed on Aug. 7, 2003.

(51) Int. Cl.
*H04M 11/04* (2006.01)

(52) U.S. Cl. .............................. 379/48; 379/37; 379/41; 379/45; 379/46; 379/51; 340/573.1; 340/573.4; 455/404.1; 455/404.2

(58) Field of Classification Search ............. 379/88.18, 379/219, 88.19, 88.21–88.22, 101.01, 88.24–88.26, 379/37–52, 90.01, 211.02–211.04, 106.09, 379/33; 455/557, 421, 404.1, 404.2; 709/206; 714/14; 340/601, 573.1, 573.4
See application file for complete search history.

(56) References Cited

U.S. PATENT DOCUMENTS

| 4,760,593 | A | * | 7/1988 | Shapiro et al. ................. 379/38 |
| 5,937,348 | A | * | 8/1999 | Cina et al. .................... 455/421 |
| 5,991,374 | A | * | 11/1999 | Hazenfield ............. 379/101.01 |
| 6,021,177 | A | | 2/2000 | Allport ........................ 379/48 |
| 6,385,314 | B1 | * | 5/2002 | Furuya ........................ 379/219 |
| 6,603,838 | B1 | * | 8/2003 | Brown et al. ............. 379/88.22 |
| 6,614,883 | B2 | * | 9/2003 | Baum et al. .................... 379/37 |
| 6,694,132 | B1 | | 2/2004 | Lausi |
| 6,696,956 | B1 | * | 2/2004 | Uchida et al. ............. 340/573.1 |
| 6,697,841 | B1 | * | 2/2004 | Sheffield et al. ............ 709/206 |
| 6,724,861 | B2 | * | 4/2004 | Newland et al. .............. 379/49 |
| 2003/0040334 | A1 | * | 2/2003 | Lee ............................ 455/557 |
| 2003/0101373 | A1 | * | 5/2003 | Freyman et al. ............... 714/14 |
| 2003/0128821 | A1 | * | 7/2003 | Luneau et al. ........... 379/88.21 |
| 2003/0197616 | A1 | * | 10/2003 | Karamanian et al. ........ 340/601 |

OTHER PUBLICATIONS

S. Pietrowicz, E.K. Tesink, "Public Alerting and Emergency Notification Solutions", Telcordia Technologies Digest of Technical Information, Digest vol. 20, No. 9, Sep. 2003, pp. 5-13.
International Search Report for PCT Pat. App. No. PCT/USO4/25411, Feb. 15, 2006.

* cited by examiner

*Primary Examiner*—Md S Elahee
(74) *Attorney, Agent, or Firm*—McDonnell Boehnen Hulbert & Berghoff LLP

(57) ABSTRACT

A message broadcast system is disclosed for quickly delivering a relatively large amount of content to customer premises devices. A dial-out voice server initiates a plurality of telephone calls to a plurality of telephone numbers associated with customer premises alerting devices. The dial-out server also transmits a control data signal to the alerting devices, which indicates an incoming voice message to the alerting devices. The customer premises devices are connected to the telecommunication network via a communication channel and are configured to continuously monitor the communication channel for the control data signal. In response to receipt of a control data signal, an alerting device automatically configures itself to receive the incoming voice message. After delivering the voice message to the alerting device, the dial-out voice server may disconnect and place another call.

32 Claims, 12 Drawing Sheets

DIAL-OUT VOICE NOTIFICATION SYSTEM

RELATED APPLICATION

This application claims the benefit of U.S. Provisional Application No. 60/493,216, filed Aug. 7, 2003, which is incorporated herein by reference.

BACKGROUND OF OUR INVENTION

1. Field of the Invention

The present invention relates generally to telecommunication systems and more generally to an automatic telephone dial-out voice notification system.

2. Description of the Background

Various types of message broadcast systems exist for broadcasting a message to a group of people. Public alerting refers to broadcasting an alert to a population within a geographic area, for example, all residences in a particular city. Emergency notification generally refers to messages sent to a specific list of recipients. This list may be further constrained, for example, to a geographical area. For example, an emergency notification may be sent to all Fire Department Chiefs within a city.

One type of message broadcast system is a dial-out voice notification system in which a computer server is used to deliver a pre-recorded voice message to a list of telephone numbers. These systems dial each number in the list and then play the pre-recorded message when the call has been answered. Multiple numbers may be dialed simultaneously, depending upon the number of ports available on the server. If there is no answer, the system moves on to the next number and will periodically re-try the no-answer telephone number. The system continues to dial the numbers until the message has been delivered to all numbers in the list (or until some time-out period has expired). Such systems may be used, for example, by governments in order to implement emergency notification systems or by corporations in order to implement broadcast messages to employees. These dial-out voice notification systems have the advantage of being able to deliver a large amount of message content. However, these systems also have the significant disadvantage of being very slow to deliver their messages and are thus often limited to using small contact lists in cases of time sensitive information.

Aside from the physical limitation of the number of ports that the server uses to connect to the telephone network, the delivery performance of dial-out voice notification systems is impacted by the time it takes to complete a call and the duration of the voice message. The call completion time is the sum of call setup time and the time it takes for a person to answer the call while it rings. Call setup time typically ranges from 3 to 5 seconds depending upon access facility and network response. Assuming that, on average, a call is answered after three ringing cycles (with a typical six second ringing cycle), the average time to answer a call is estimated at 18 seconds. With a 30 second voice message, it is seen that each call will last approximately 52 seconds (18+30+4). Thus, with even a fairly modest number of recipients, delivering messages in this manner can take hours, if not days.

Another problem with current dial-out voice notification systems is that upon answering such a call, a listener is likely to require several seconds to understand the nature of the call (since the receipt of a broadcast message may be unexpected), which may result in the listener missing part of the message. In order to deal with such situations, dial-out notification systems usually allow the user to request a replay of the message. While this aids in ensuring that listeners understand the message, this extends the call duration and further delays delivery of the message to all intended recipients. For example, if the listener requests a message to be replayed, the call duration now becomes 82 seconds (18+30+4+30), limiting each server port to no more than 43 calls per hour.

Answering machines pose additional difficulty for dial-out systems. First, answering machines are usually configured to be the device of last resort to answer an incoming call. In this environment, answering machines are generally set to pick up after 5 ringing cycles. Whereas the previous examples used 3 ringing cycles on average, the extension to 5 ringing cycles adds another 12 seconds to the call duration. Second, when the answering machine picks up, it begins to play a greeting that may last for 5 to 10 seconds before beginning to record, thus adding additional time to the call duration. Third, when an answering machine picks up, dial-out servers experience difficulty in determining whether they are communicating with a person or another machine. If the dial-out server falsely believes it is communicating with a person, it may begin to play the message before the recording starts. As a result, the initial part of the message, which most likely identifies the nature of the emergency, may not be recorded. If the dial-out server determines correctly that it is communicating with another machine, it may still incorrectly detect the moment that recording begins because answering machines do not all use the same prompt tone, if any at all. One solution to this problem is to automatically repeat the message resulting in a 94 second call (30+30+4+30).

Further, in situations where the call is not answered, the server must periodically re-try no answer telephone numbers. Each no-answer attempt will consume an additional 34 seconds (30+4), assuming the server abandons the attempt after 5 rings. If 30% of the telephone numbers result in no answer on their first attempt, the average call duration is extended by about 20%. Statistics from commercial dial-out services confirm that no-answer calls, busy lines and answering machines prominently degrade call throughput. Thus, as can be seen, while current dial-out voice notification systems allow for the delivery of a large amount of message content, several limitations may make them too slow for many time sensitive applications.

One system for addressing the speed issues of the dial-out notification systems is described in U.S. Pat. No. 6,021,177, which describes an alarm/notification device that connects to a telephone line and monitors the telephone line for a specific alarm signal. When the special signal is received, the device responds with a visual and/or audible notification. The visual notification may include an LCD for displaying a short text message. An advantage to this type of system is its speed. This type of system can send messages to homes much more quickly than the above described dial-out voice notification systems. However, the trade-off for speed is the lack of significant message content. The text message of this type of system is limited to a relatively small number of characters (typically 10 to 60), and therefore this system cannot deliver the extensive message content of the dial-out voice notification systems.

As can be seen, the current message broadcast systems must make a trade-off between content and speed. The dial-out voice notification systems are able to deliver a large amount of content but are very slow to deliver such content to even a moderately large recipient population. The system described in U.S. Pat. No. 6,021,177 is able to deliver its content quickly but is significantly limited in the amount of content it can deliver.

Therefore, there is a need for a message broadcast system that can more quickly deliver a large amount of content.

BRIEF SUMMARY OF THE INVENTION

The present invention solves the problems of the prior art by providing a message broadcast system that can quickly deliver a relatively large amount of content to customer premises devices.

In accordance with the principles of the invention, a dial-out voice server initiates a plurality of telephone calls to a plurality of telephone numbers associated with customer premises alerting devices. The dial-out voice server also transmits a control data signal to the alerting devices. The control data signal indicates an incoming voice message to the alerting devices.

The customer premises devices are connected to the telecommunication network via a communication channel, and the devices are configured to continuously monitor the communication channel for the control data signal. In response to receipt of the control data signal, the alerting device automatically configures itself to receive the incoming voice message. This automatic configuration occurs without end user intervention, and so the delay introduced by end user interaction is avoided in accordance with the principles of the present invention. After delivering the voice message to the alerting device, the dial-out voice server may disconnect and place another call.

The principles of the present invention may be implemented in various embodiments. For example, with respect to the dial-out server, there are various ways that the dial-out server may initiate the calls to the customer premises and transmit the control data signal. In one embodiment, the dial-out voice server initiates its calls as suppressed ringing telephone calls, which results in the establishment of voice paths with the customer premises devices without applying conventional ringing to the lines. The control data signal is then transmitted as an in-band data signal via the established voice path. Alternatively, the dial-out voice server may initiate its calls by signaling the control data to the network such that the control data signals may be transmitted as in-band signals or out of band data. As will be described in further detail below, various on-hook and off-hook data transmission techniques may be used, including caller-ID and call waiting services.

As described above, the alerting device continuously monitors the communication channel for receipt of a control data signal indicating an incoming voice message from a dial-out server. The control data signal may be received in various ways, depending upon how the dial-out server and the data network transmit the data signal. As described above, upon receipt of an appropriate control data signal, the alerting device automatically configures itself to receive the incoming voice message. This automatic configuration may result in the alerting device automatically answering the incoming call. In addition, upon receipt of a control data signal, the alerting device may initiate various types of alarm signals to end users at the customer premises indicating that a voice message has been received. The alerting device may also record the voice message such that a user at the customer premises can access the message at a later time. Thus, even if the user is not available at the customer premises to receive the message, the message is still delivered and the dial-out voice server may continue on with its next call without re-trying the call again at a later time. The alerting device may implement various types of confirmation and authentication services to help assure that the voice messages are in fact received, and received by an authorized user.

Another advantage of a system in accordance with the present invention is that the voice message facilities of the dial-out voice server may be more efficiently utilized. As will be described in further detail below, a system in accordance with the present invention does not have the call establishment variability of prior art systems because calls are answered automatically by the customer premises alerting devices. As a result, calls made by a dial-out voice server to dialed numbers on the same terminating switch are likely to have very similar call establishment times. This results in the possibility of sharing one voice message facility of the dial-out voice server among many calls, and allows for design of a dial-out voice server with less dedicated voice message facilities while still being able to service many simultaneous calls.

The principles of the present invention may be implemented in various types of networks, including wireline telephone networks, wireless telephone networks, cable networks, and packet networks.

These and other advantages of the invention will be apparent to those of ordinary skill in the art by reference to the following detailed description and the accompanying drawings.

DETAILED DESCRIPTION

Figure 1:
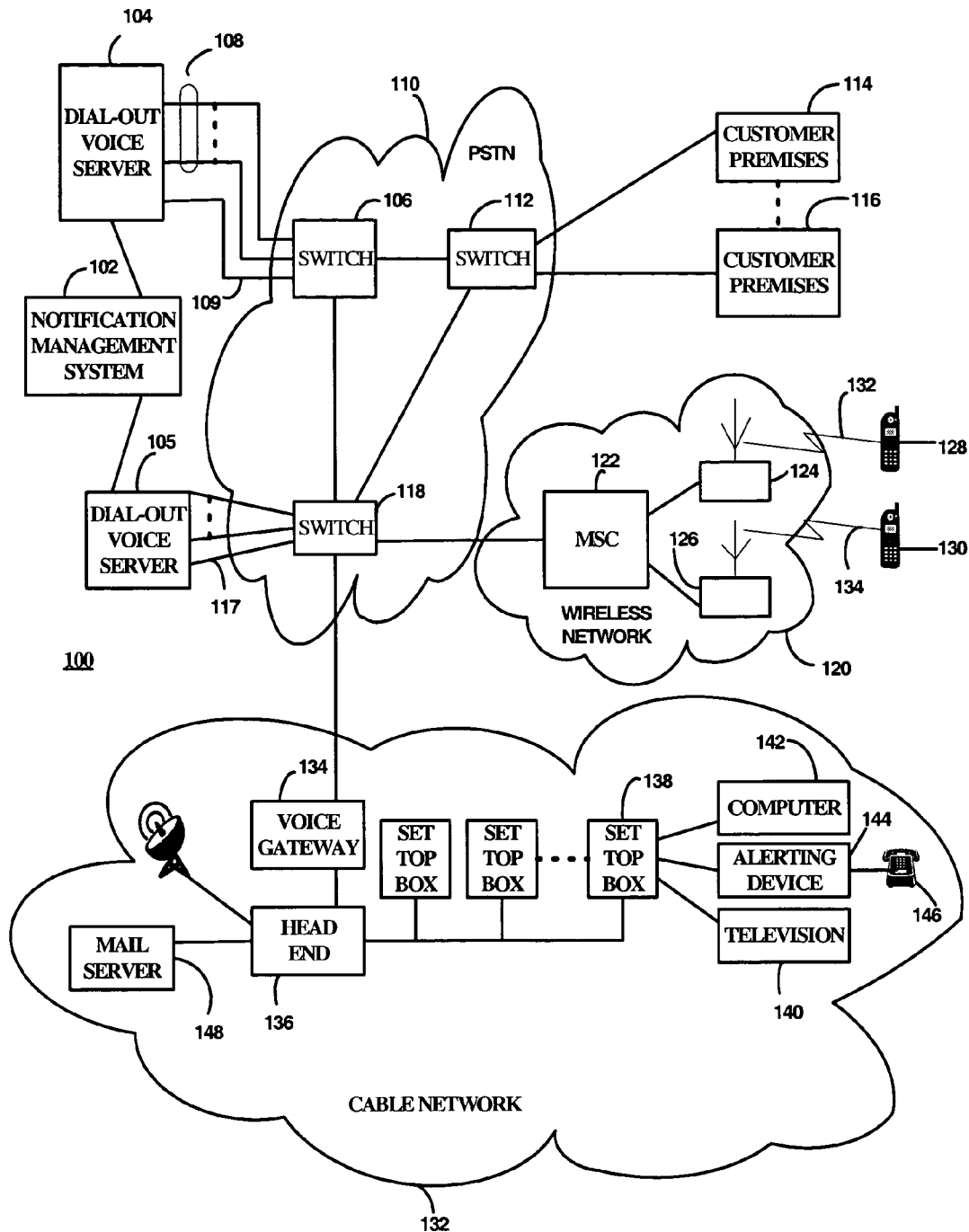
FIG. 1 shows a block diagram of a network in which the present invention may be implemented.

FIG. 1 shows a block diagram of a network 100 in which the present invention may be implemented. The network includes a notification management system 102 with which a user interacts in order to initiate and control the dial-out voice notification service. Under user control, the notification management system 102 identifies the telephone numbers of the target population and distributes the telephone number lists and the pre-recorded voice message to one or more dial out voice servers, such as dial-out voice servers 104 and 105. The notification management system 102 may be implemented as an appropriately programmed computer, and the details of the configuration of the notification management system are not required for an understanding of the principles of the present invention. The notification management system 102 may be directly connected to the dial out voice servers, or may be connected via a data network (e.g., local area network, wide area network, etc.). Dial-out voice server 104 is connected to the public switched telephone network (PSTN) 110 via a switch 106. The dial-out voice server 104 is connected to switch 106 via a plurality of ports 108. The number of ports 108 defines the number of simultaneous calls that may be initiated by the dial-out voice server 104. A trunk control channel 109 is typically present with digital access trunks for signaling call setup information. Typical trunking connections include ISDN-PRI and channelized T1 consisting of E & M trunks or loop start lines. Switch 106 may be connected to one or more additional switches, such as switches 112, 118, which allows for calls to be routed throughout the PSTN and eventually terminate at customer premises. Switches that connect to customer premises may be referred to as terminating switches or central office switches. In FIG. 1, switch 112 is a terminating switch that is connected to customer premises 114 and 116. While only two customer premises 114, 116 are shown in FIG. 1, a typical terminating switch will be connected to many customer premises.

Dial-out voice server 105 of FIG. 1 is shown connected to the PSTN 110 via switch 118. Switch 118 acts as a network gateway and also connects to wireless network 120 via a wireless switch, referred to as a mobile switching center (MSC) 122, and a cable network 132 via a voice gateway 134 (which may be implemented by a soft switch). MSC 122 is further connected to base stations 124 and 126. Base stations 124 and 126 are shown communicating with wireless devices 128 and 130 via air interfaces 132 and 134 respectively. Voice gateway 134 is further connected to a head-end 136 that broadcasts multimedia, voice and data to set top boxes 138 that provide video access for televisions (e.g. television 140), internet access for computers (e.g. computer 142) and telephone access for telephones (e.g. telephone 146). Alerting device 144 shown connected to set top box 138 will be described in further detail below. The configuration of telecommunication networks, such as network 100, including switches, MSCs, base stations, voice gateways, and head-ends is well known in the art and will not be described in detail herein.

While the dial-out servers 104, 105 are shown connected to the PSTN 110 for convenience, they may also be directly connected to MSC 122 or the voice gateway 134 and retain their ability to contact alerting devices in any of the sub-networks (PSTN, Wireless and Cable).

Figure 2:
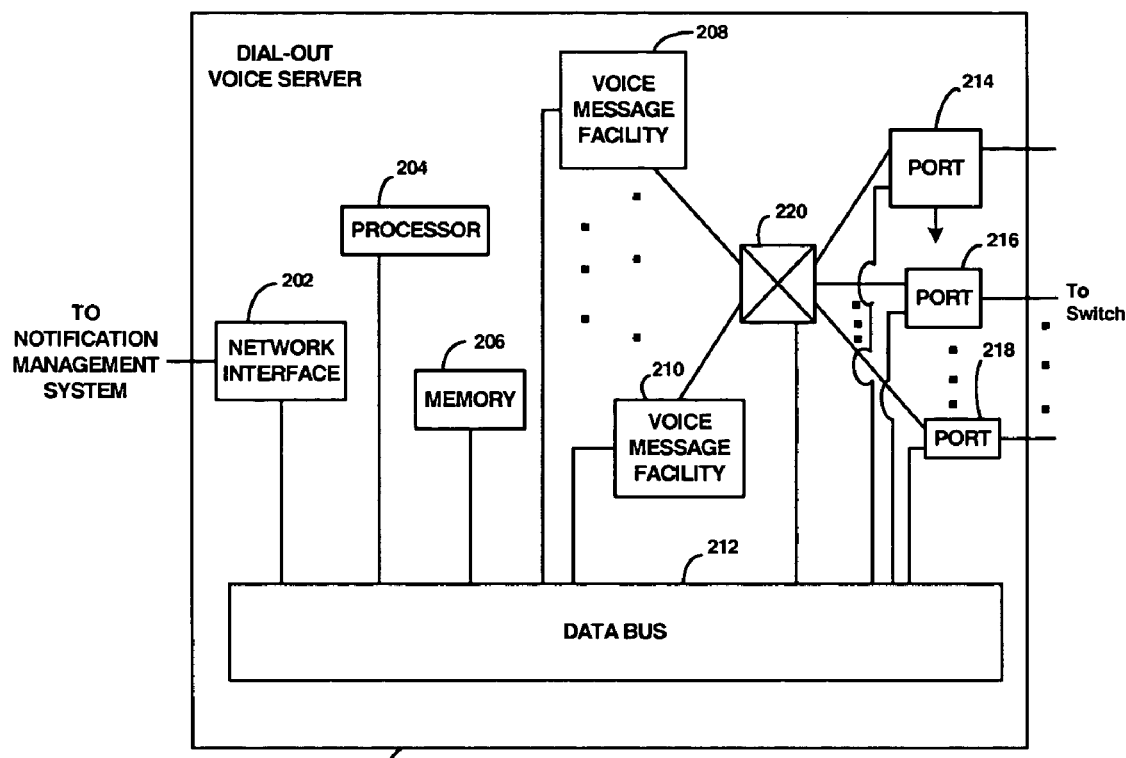
FIG. 2 shows a block diagram of a dial-out voice server in accordance with the invention.

FIG. 2 shows further details of a dial-out voice server 200. Dial-out voice server 200 contains a network interface 202 for communicating with a data network. In the implementation shown in FIG. 1, the network interface 202 would provide for communication with the notification management system 102. The dial out voice server 200 also contains one or more processors (e.g. processor 204) that control the overall functioning of the dial-out voice server 200. As is well known in the art, the dial-out voice server 200 may be implemented as an appropriately programmed computer, whereby the operation of the dial-out voice server 200 is defined by the execution of computer program instructions. The computer program instructions may be stored in memory 206. Memory 206 also contains other data required for the operation of the dial-out voice server 200. It is to be understood that memory 206 represents any type of storage medium, including magnetic, optical, electronic, or otherwise. Further, while only one memory 206 is shown in FIG. 2, memory 206 may be implemented as any one or more types of storage media. Dial-out voice server 200 also contains one or more voice message facilities, for example voice message facilities 208, 210. The voice message facilities 208, 210 operate to play the voice recordings to be distributed to the various customer premises. The message may be stored in analog or digital format in memory 206, and the voice message facilities 208, 210 convert the stored message to an analog or digital voice signal for distribution to the output ports 214, 216, 218 of the dial-out voice server 200. The output ports 214, 216, 218 are connected to the telephone network switch as described above in conjunction with FIG. 1. The voice message facilities 208, 210 are connected to the output ports 214, 216, 218 via internal switch 220, which can connect a single output of a voice message facility to multiple ones of the output ports 214, 216, 218. The benefit of such a configuration will be described in further detail below. The various components of the dial-out voice server 200 may be interconnected, for example, using a data bus 212 in a manner that is well known in the art.

Figure 3:
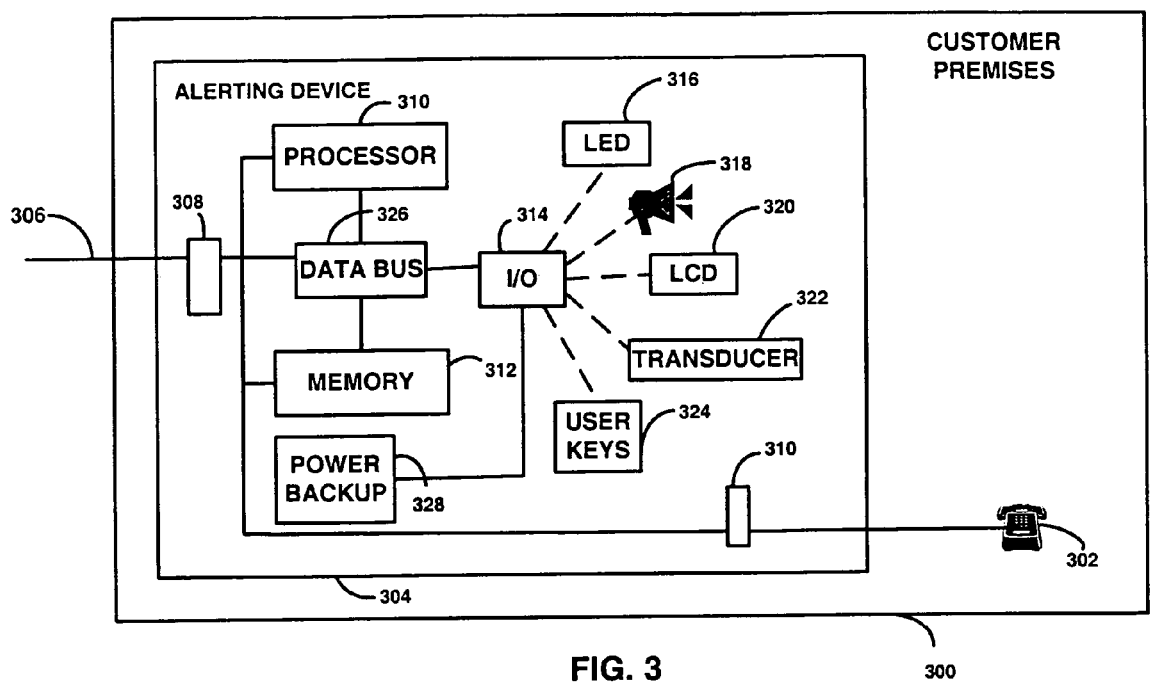
FIG. 3 shows a block diagram of a customer premises in accordance with the invention.

Further details of a customer premises 300 is shown in FIG. 3. FIG. 3 shows an alerting device 304 connected between an incoming telephone line 306 and a standard telephone 302. The alerting device 304 contains two standard RJ-11 telephone ports 308, 310 for connecting the device between the telephone line 306 and the telephone 302. This allows the alerting device 304 to constantly monitor the telephone line for certain data and mute signals to and from standard telephone 302 when necessary, as will be described in further detail below. When the alerting device 304 detects certain data, it may initiate appropriate processing. Otherwise, regular telephone calls arriving via line 306 may be passed to telephone 302 via port 310 for normal processing by telephone 302. The alerting device 304 contains a processor 310 that controls the overall operation of the alerting device 304. As is well known in the art, the operation of the alerting device 304 may be defined by the execution of computer program instructions stored in memory 312. Memory 312 also contains other data required for the operation of the alerting device 304. It is to be understood that memory 312 represents any type of storage medium, including magnetic, optical, electronic, or otherwise. Further, while only one memory 312 is shown in FIG. 3, memory 312 may be implemented as any one or more types of storage media. Alerting device 304 also contains various input/output devices for interfacing with a user. There are many various types of input/output devices that may be used in order to interface with users, and as used herein, I/O 314 represents any type of input/output device. For example, typical input/output devices that may be used include one or more light emitting diodes (LED) 316, a speaker for audio output 318, a liquid crystal display (LCD) 320, a transducer 322 for producing physical movement (e.g., vibration), and various user keys 324 for allowing users to enter various commands to the alerting device 304. The various components of the alerting device 304 may be interconnected, for example, using a data bus 326 in a manner that is well known in the art. A backup power source 328, such as a battery, is provided to allow the alerting device to function and receive messages when commercial power has failed but telephone access is still working. The functioning of the alerting device will be described in further detail below. One skilled in the art will recognize that there are various possible configurations for an alerting device in accordance with the principles of the present invention. For example, while a programmable processor 310 is shown in FIG. 3, it would be recognized by one skilled in the art that the desired functionality of an alerting device may also be obtained using hardware instead of software, or some combination of hardware and software. One skilled in the art will also recognize that the alerting device can be incorporated into a personal computer or television with the appropriate peripheral equipment, such as speakers and a telephone interface card, to make use of a richer set of capabilities, such as email, paging, web posting or a more prominent screen display.

Figure 4:
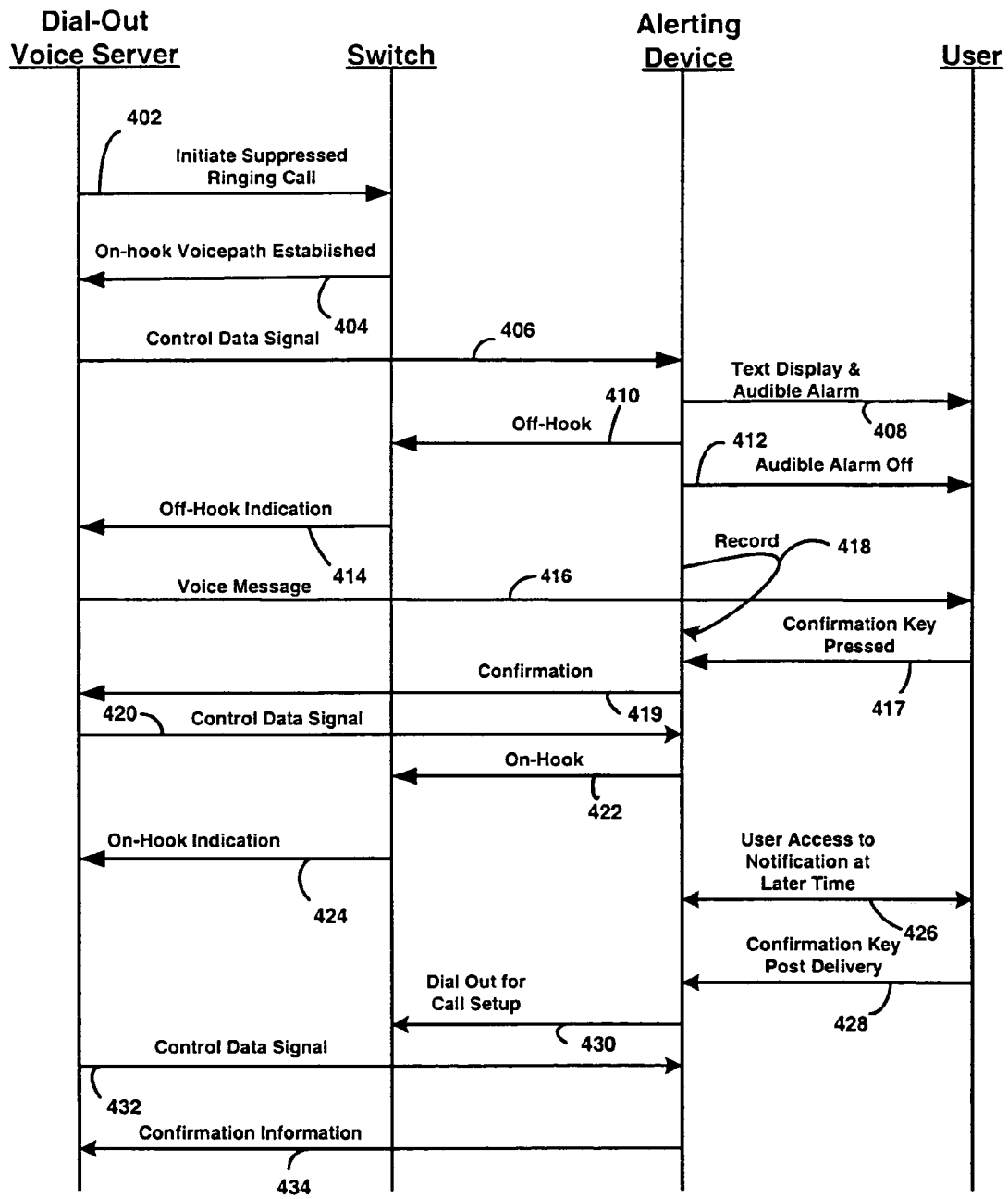
FIG. 4 shows a call flow diagram of an embodiment of the invention utilizing suppressed ringing calling.

One embodiment of the invention will now be described in conjunction with the call flow diagram of FIG. 4. In this embodiment, the called line to be altered is on-hook. The vertical lines of FIG. 4 represent a dial-out voice server (e.g., 104 or 105), a telecommunications network switch (e.g., 106, 112 or 118), an alerting device (e.g., 304), and a user respectively. The horizontal arrows represent call flow messages and data being transmitted between the entities. The sequential timing of the messages is depicted by the relative vertical position of the arrows, whereby the first message is shown at the top of the diagram and the messages progress sequentially by moving down the diagram. Absolute timing is not shown by the diagram, but instead, only relative timing. In accordance with a first embodiment of the invention, assume that the notification management system identifies a list of telephone numbers that need to receive a broadcast voice message. As discussed above, this message may be an emergency broadcast (e.g., weather alert) or an informational broadcast (e.g., corporate facility closing). The notification management system 102 will transmit a list of telephone numbers along with the voice message to one, or both, of the dial out voice servers 104, 105. Which server to use will depend upon the telephone numbers to which the voice message is to be delivered. Certain telephone numbers may be more efficiently served by one or the other of the dial-out voice servers, depending upon the topology of the telecommunications network. For example, certain telephone numbers may be assigned to a dial-out voice server based on the server's proximity to the terminating switch serving the particular telephone numbers or its connection to a sub-network. The particular selection of dial-out voice servers to use is not required for an understanding of the principles of the present invention.

For purposes of discussion of FIG. 4, assume that the dial-out voice server is server 104, the switch is terminating switch 112, and the alerting device is one or more of the alerting devices in customer premises 114, 116. First, server 104 initiates a suppressed ringing call (402) to the terminating switch 112. A suppressed ringing call utilizes special switch features that permit the dial-out voice server to establish a connection to a destination telephone number without applying normal ringing. In one embodiment, the suppressed ringing call is initiated by sending a call setup message to terminating switch 112 over a digital access facility, such as ISDN (Integrated Services Digital Network), using a suppressed ringing access feature. For example, using the Suppressed Ringing Access Feature available on the Nortel DMS 100 switch, the call originated by server 104 is routed to a special dialed number (DN) on the terminating switch. Here, the actual destination telephone number is placed in an auxiliary number field. The terminating switch responds to all calls to this special DN by invoking the Suppressed Ringing Access feature. The switch takes the actual line destination from the auxiliary number field and establishes a voice connection between the server and the destination line without applying ringing. Once the voice path is established, an indication (404), such as a Q.931 ISDN message, is sent back to the dial-out voice server informing it that the voice path has been established in the on-hook state. If digital loop carrier equipment is in the loop plant and it is not configured with full-time on-hook transmission or has power-down mode enabled, the suppressed ringing call can optionally be established with a preceding short ping ring or open switching interval (OSI) to awaken the digital loop carrier equipment to assign a voice channel so that the path is completed to the customer premises.

In an alternative embodiment, rather than using a digital access facility to establish a suppressed ringing telephone call, the Utility Telemetry Service Feature originally developed for remote meter reading applications can be used. Here, server 104 seizes an analog UTT trunk to switch 112 and transmits the actual destination telephone address to the switch using an inband signaling protocol. The switch in turn establishes a connection to the destination line without ringing and sends an indication (404) back to the server. Although this variation uses an analog trunk and requires direct trunking to each switch, functionality similar to the Suppressed Ringing Access Feature is achieved. Also, the Utility Telemetry Service Feature is more widely available since it was the first suppressed ringing access capability standardized in IEEE Standard for Automatic Meter Reading via Telephone—Network to Utility Controller (1329). Both features, however, perform the same function of opening a voice channel from the server 104 to the customer premises in the on-hook state without applying normal ringing.

In both cases, upon receipt of indication 404, the dial-out voice server generates an in-band control data signal 406 that specifies a text parameter, a message ID parameter, an alarm control parameter, a hook-switch control parameter and a voice record control parameter. For example, this in-band control data signal 406 can be a Multiple Data Message Format (MDMF) message generated using the signaling methods described in Telcordia Technologies Generic Requirements, GR-30-CORE Voiceband Data Transmission Interface (GR-30-CORE), which requirements are well known and commonly used for Caller-ID delivery. The alerting device at the user premises receives this signal.

The alerting device 304 at the user premises 300 is connected to the telephone line 306 and constantly monitors the telephone line 306 for control data signals such as control data signal 406. Again, the embodiment of our invention as depicted in FIG. 4 corresponds to the case when telephone 302 is in the on-hook state when the message 406 is received at the customer premises 300. Upon receipt of the control data signal 406, the alerting device 304 decodes the message and displays the text message in the text field on its LCD display 320. The alarm control parameter is decoded and an appropriate alarm is activated (e.g., audible via speaker 318, visual via LED 316 and/or movement via transducer 322) in order to get the attention of the occupants of customer premises 300. Of course, various combination of alerting mechanisms may be used depending upon particular implementations. The display of the text message and the sounding of an audible alarm are represented in FIG. 4 by message 408.

While the alarm is sounding, the alerting device 304 decodes the hook-switch control parameter and the voice record control parameter. If the dial-out voice server requested to send a voice message to the alerting device, then the hook-switch control parameter will instruct the alerting device to proceed to the off-hook condition upon cessation of the initial alarm. Upon going off-hook (410), the switch reports the off-hook condition to the dial-out voice server via message 414. After going off-hook, the alerting device turns off its audible alarm (412) and waits for receipt of the voice message from the dial-out voice server. Upon receiving an indication 414 from the switch that the altering device has gone off-hook, the dial-out voice server transmits a voice message 416 to the user via the opened voice path. The alerting device plays the voice message to occupants of the customer premises 300 via speaker 318. Also, if the voice record control parameter received in message 406 indicated that the alerting device should record the message, then the alerting device 304 records the voice message as represented by 418. The voice message may be recorded, for example, in memory 312 of the alerting device 304. The alerting device stores the voice message and associates it with the text message and any other event information for later retrieval by the occupants of the customer premises.

Message delivery confirmation is often advantageous in message broadcast systems. For example, especially in an emergency notification system, it is advantageous to provide for confirmation of message delivery to the intended recipients. In order to provide message confirmation in conjunction with the principles of the present invention, the alerting device 304 may be configured additionally with a confirmation button, (e.g., one of user keys 324). Pressing the confirmation button (417) sends a short indicator (e.g., DTMF tone) (419) to the dial-out voice server to confirm delivery. Preferably, the recipient would press the confirmation button during the audible alarm or voice message to confirm delivery in response to prompts either in the voice message itself or LCD display. The alarms and voice message are played in advance of a request to confirm delivery to avoid introducing a waiting period for the user to confirm. The alarm and voice message inherently provides an interval during which the occupant is alerted and can move to the device to confirm while listening to the message.

Upon delivery of the voice message, the server sends the alerting device another control data signal 420. This control data signal 420 instructs the alerting device to go on-hook and adjusts the state of the alarm condition with its display of text, light, and/or sound. The device then goes on-hook (422). Upon receiving an indication 424 from the switch that the device is on-hook, the dial-out voice server disconnects and proceeds to its next call. Thus, as can be seen from the above description, one advantage of the present invention is that the alerting device receives the broadcast message whether or not any occupants are present at customer premises 300 to receive the call. Even if there are no occupants present, the voice message is delivered and stored in the alerting device for later retrieval by the occupants, as illustrated by 426. In the meantime, the dial-out voice server may move on to deliver the voice message to the next recipient telephone number. Since the voice message may be delivered without user intervention, and since there is no time lost applying ringing, waiting for an answer, or retrying busy lines, the performance of the dial-out voice server system is substantially increased. Furthermore, since the message is now stored locally in the alerting device, a request from the occupant to be replay a message does not delay the dial-out server from proceeding to its next delivery. While FIG. 4, (as well as FIGS. 5-11 that follow) describes the processing of a single call, it is to be understood that in a typical embodiment the dial-out voice server will place many simultaneous calls. The number of simultaneous calls is generally limited by the number of ports connecting the dial-out voice sever to the network.

As indicated, if an occupant is not present when a message is received, the occupant can retrieve that message at a later time (426). In a further embodiment of the invention, the retrieval of the message can cause a confirmation be sent to the dial-out voice server. Specifically, in the case where the user is not available when the message arrives, the alerting device has a stored local copy of the message in its memory 312. The alerting device, still in an alarm condition, attracts the occupant upon their return. Pressing a button to play the stored message 428 automatically generates a post-delivery confirmation where the alerting device dials out to a preprogrammed number (430) that terminates to the dial-out server 104, 105. Upon answer, the dial-out server transmits a control data signal 432 to positively inform the alerting device that it has answered because no answer indicator or line-side supervision is provided on residential lines. Upon receipt of the control data signal 432, the alerting device reports its telephone number and message ID of the message being confirmed by encoding the information in a series of DTMF tones (434), for example.

Figure 11:
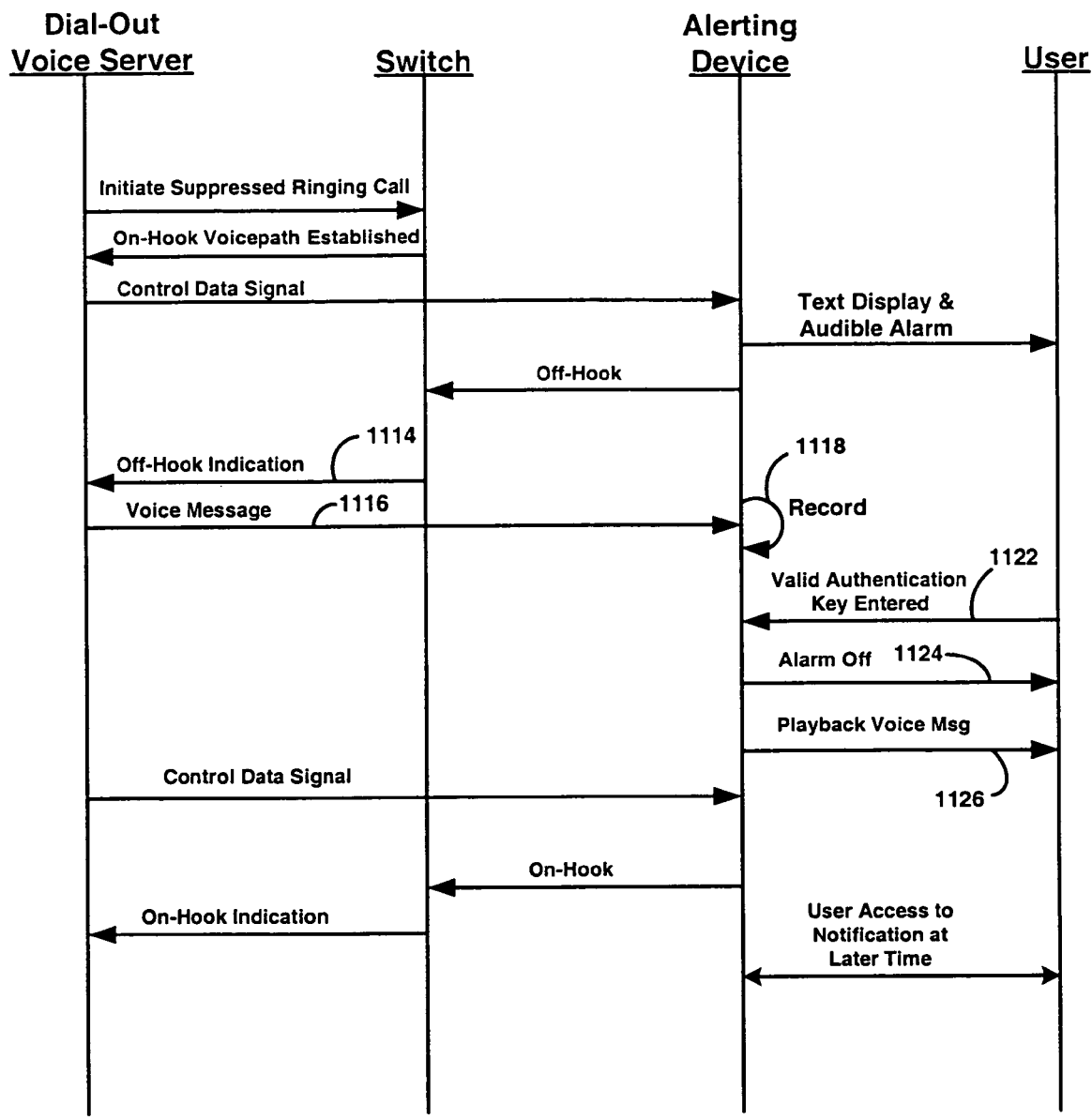
FIG. 11 shows the message flow diagram of FIG. 4 with an authentication capability added.

In certain government and law enforcement applications, it is desirable to authenticate the listener before providing the message. In order to provide a user authentication capability in conjunction with the principles of the present invention, the control data signal would also contain an authentication key code parameter. FIG. 11 shows the message flow diagram of FIG. 4 with the authentication capability added. Referring to FIG. 11, in response to receiving the control data signal, the alerting device 304 activates its audible and visual alarms. The alerting device then proceeds to the off-hook state, causing the switch to provide an indication 1114 of this event to the server. The server then sends the voice message 1116 as before, but instead of playing the message in speakerphone mode, the alerting device records it, as indicated by 1118. The audible alarm and text display attract the occupant's attention to the alerting device. The alarms remain active until a valid authentication key is entered into the alerting device or a predetermined time-out interval expires (such timeout interval may be separately defined for each alarm indicator). In particular, to access the message, the occupant enters a key code in the alerting device (1122). If the key code matches the authentication code sent in the control data signal, the alerting device turns off the audible alarm (1124), plays the stored message from the start (1126), and reports confirmation as previously described, if necessary. In an advantageous implementation, message playback occurs while the latter part of the message is still being recorded. However, to simplify the alerting device and lower its cost, playback could be delayed until message recording has stopped.

To avoid an unauthorized user from picking up an extension phone and listening to the message as it is being sent to the alerting device from the dial-out server, it is desirable to encode/encrypt the voice message 1116 as a data signal using a low bit rate vocoder and/or encryption algorithm. The alerting device would contain the necessary software algorithms to decode/decrypt the voice message using its processor 310.

Figure 5:
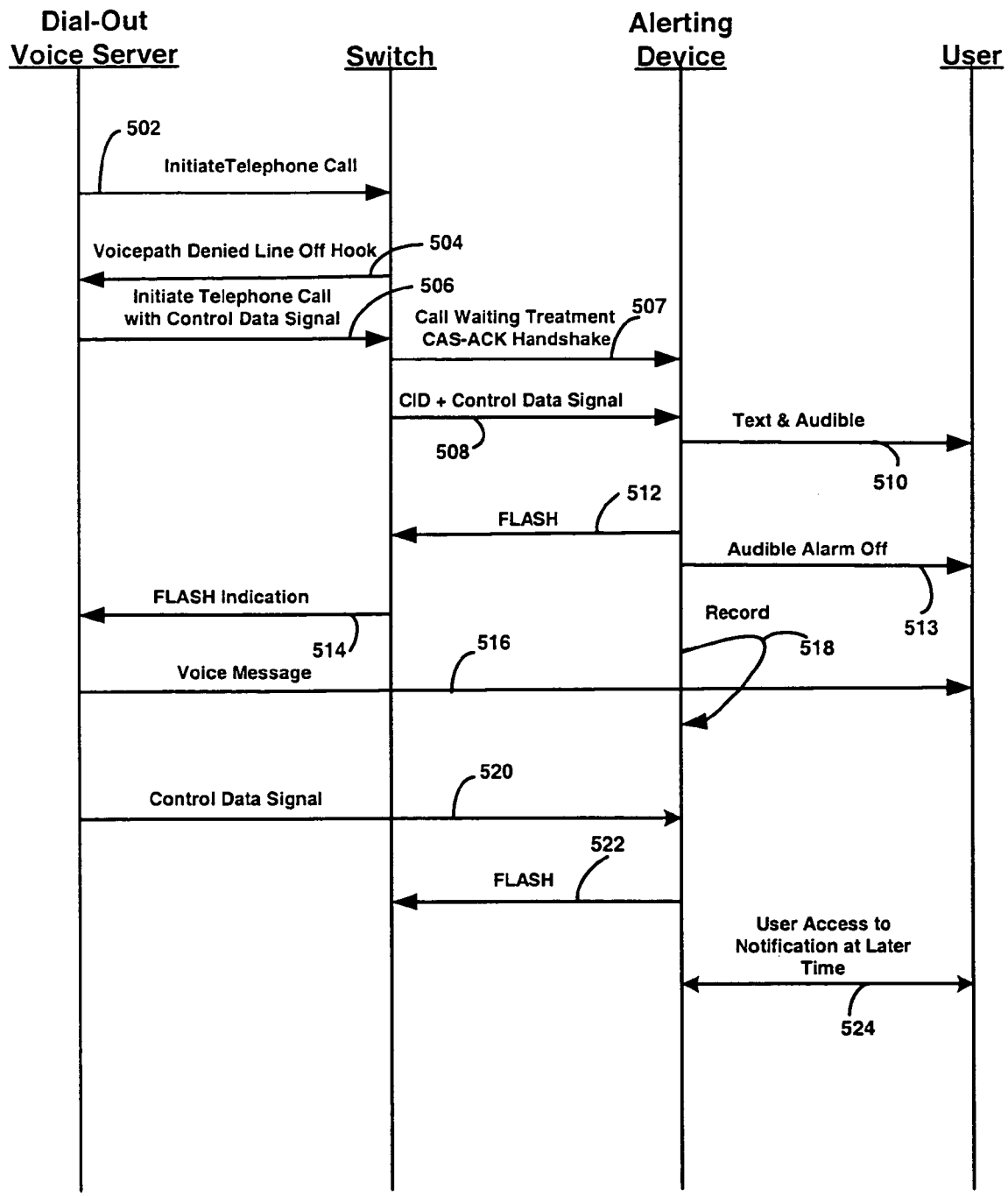
FIG. 5 shows a call flow diagram of an embodiment of the invention in which the customer premises telephone is off-hook when a call is received from the dial-out voice server.

FIGS. 4 and 11 illustrate call flow diagrams in which the customer premises telephone was on-hook when the call was received from the dial-out voice server. FIG. 5 shows a call flow diagram of an embodiment of the invention in which the customer premises telephone is off-hook (i.e., is engaged in a telephone call when a call is received from the dial-out voice server). As described above, assume that the notification management system identifies a list of telephone numbers which need to receive a broadcast voice message and transmits the list of telephone numbers, along with the voice message, to one, or both, of the dial out voice servers 104, 105.

With reference to FIG. 5, dial-out voice server 104 first initiates a telephone call (502) by sending a call setup message or by seizing a trunk to terminating switch 112 as previously described. Unlike the flow of FIG. 4, the switch will return an appropriate indication 504 that the voice path has been denied because the customer premises is currently off-hook. In response to receipt of this indication 504, the dial-out voice server re-initiates the telephone call. In one embodiment, a digital access facility, such as ISDN, is used to reinitiate the call. Here, the server embeds a control data signal 506 within the call setup in order to deliver the signal to the terminating switch and also specifies within the call setup that the server should terminate the call attempt as a call waiting to the customer premises, sending the control signal 506 to the customer premises utilizing an "off-hook data transmission protocol", such as that used by Calling Identity Delivery on Call Waiting service as specified in Telcordia Technologies GR-575-CORE Calling Identity Delivery on Call Waiting and GR-30-CORE. Here, the dial-out server could embed the control data signal 506 in a generic field of the access trunk control protocol, such as the Q.931 FACILITIES message, to pass it to the switch. During setup of the telephone call, the control data signal 506 would remain associated with the voice path being established. Accordingly, contrary to FIG. 4, this embodiment simultaneously sets up a voice path between the dial-out voice server and terminating switch and delivers the control signal 506 from the server to the switch, the switch then delivering the signal 506 to the customer premises using call-waiting as further described below. Overall, note that this capability of allowing the dial-out voice server to simultaneously establish a voice path and send a special data message to the switch, and the switch then using the "off-hook data transmission protocol" to deliver the message to the customer premises is possible using switch feature enhancements similar to those described in U.S. patent application Ser. No. 09/626,437 entitled "Method and System for Transporting Generic Data Messages Over the Public Switched Telephone Network to Customer Premises Equipment Without Establishing a Call", which is incorporated herein by reference.

As an alternative to delivering the control signal through the digital access means as just described, the server can also use an analog UTT trunk to establish the call. Here, the server seizes a trunk to terminating switch 112. The server then uses the inband transmission protocol to convey the control signal 506 to terminating switch 112 and to instruct the switch that the call attempt to the customer premises should terminate as a call waiting and that the control signal 506 should be sent to the customer premises utilizing the "off-hook data transmission protocol."

Regardless of how the control signal 506 is delivered to the terminating switch or how the call waiting treatment is signaled to the switch, the terminating switch applies the call waiting treatment to the customer premises line regardless of whether the customer is subscribed to the service. The capability for the originating end to force call-waiting treatment exists in the form of the Call Waiting Originating feature. Call waiting treatment causes the call currently in progress at the customer premises to be interrupted with the far end path being muted. In particular, assuming the customer premises uses an analog interface, tone and data resources from the terminating switch are first connected to the line to initiate a CPE Alerting Signal (CAS)—Acknowledgment handshake 507. As described above, the alerting device continuously monitors the telephone line 306, even when the customer premises telephone 302 is engaged in a call and is in the off-hook position. Upon receiving the CAS, the alerting device mutes the path to the telephone 302 to create a clear communications channel to the switch and transmits the acknowledgment signal as described in GR-30-CORE. The terminating switch responds by transmitting (508) the control data signal 506 and optionally the Caller-ID of the dial-out server. After the last byte of the control data signal has been transferred, the terminating switch re-establishes the existing call and the alerting device reconnects the telephone path 310.

As described above, the control data signal specifies a text parameter, a message ID parameter, an alarm control parameter, a hook-switch control parameter and a voice record control parameter. Upon receipt of the control data signal 506, the alerting device 304 decodes the message and displays the text message and Caller ID if provided, and activates appropriate alarms as described above. The display of the text message and the sounding of the audible alarm are represented in FIG. 5 by 510.

While the alarm is sounding, the alerting device 304 transmits a FLASH signal 512, for example, to the switch, assuming again an analog interface. A FLASH signal is a well known telecommunication signal which may also be generated, for example, when a user quickly presses and releases a telephone switch hook for a period of 500 ms. As is well known in the art, the FLASH signal indicates to the switch that the customer premises wishes to be connected to the waiting telephone call—in this case a connection to the dial-out voice server. After signaling FLASH, the alerting device turns off its audible alarm (513) and waits for receipt of the voice message from the dial-out voice server. The switch then sends an indication 514 of the FLASH signal to dial out voice server indicating that the customer premises has signaled a FLASH and that a voice path exists between the server and customer premises. Upon receipt of the message 514 from the switch, the dial-out voice server transmits a voice message to the user via the voice path as represented by 516. The alerting device plays the voice message to occupants of the customer premises 300 via speaker 318. Also, if the voice record control parameter received in message 508 indicated that the alerting device should record the message, then the alerting device 304 records the voice message as represented by 518. The voice message may be recorded, for example, in memory 312 of the alerting device 304. The alerting device stores the voice message and associates it with the text message and any other event information for later retrieval by the occupants of the customer premises. Confirmation and user authentication may be provided by user keys 324 and decoder algorithms executed by processor 310 as described above.

Upon delivery of the voice message, the dial-out voice server sends to the alerting device an in-band control data signal 520. The dial-out voice server then disconnects and proceeds to its next call. The control data signal 520 instructs the alerting devices to signal a FLASH to the switch, and adjust the alarm condition with its display of text, light, and/or sound. The alerting device then signals the FLASH (522) and the switch re-establishes the previous call that was interrupted by the dial-out voice server call. The occupants at the customer premises may access the message at a later time as represented by 524.

As described in FIG. 5, the dial-out voice server must make two call attempts if the customer premises device is currently off-hook. As an alternative, the dial-out voice server may also embed the control data signal 506 on the first attempt to initiate the telephone call 502 to eliminate the need to reinitiate the suppressed ringing call in 506 if the line is busy. For example, using the digital access methodology described above, the dial-out voice server can embed the control data signal 506 within the call setup and specify within the call setup that the call attempt should terminate as a call waiting to the customer premises if the line is off-hook (delivering the control signal 506 to the customer premises utilizing an off-hook data transmission protocol) or if the line is on-hook, that the terminating switch should deliver the control data signal to the customer premises utilizing an on-hook data transmission protocol without power ringing as described in GR-30-CORE. Nonetheless, this implementation is less advantageous since it consumes shared switch data resources to deliver the control data signal and is thus susceptible to additional sources of blocking and delay.

Figure 6:
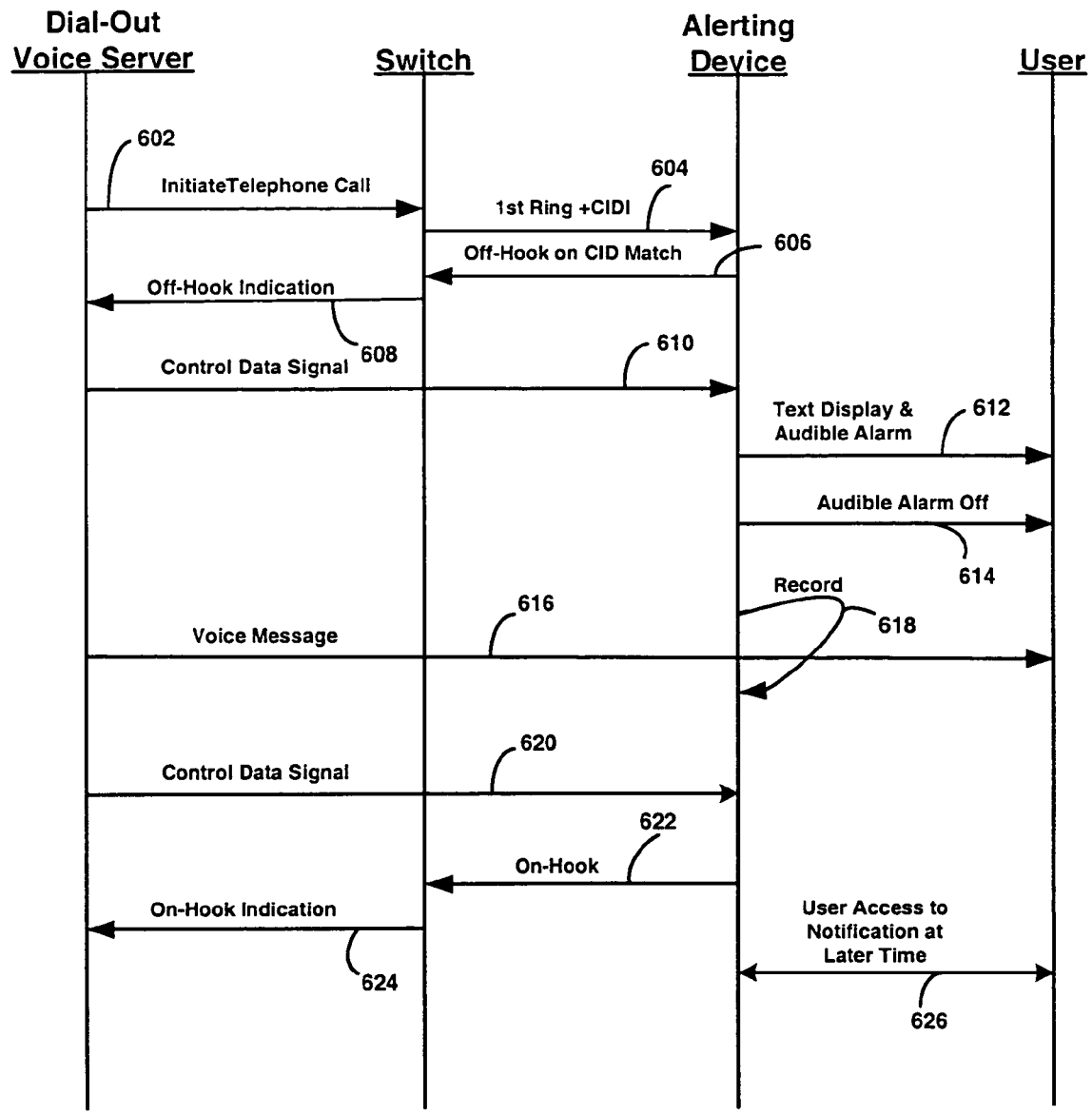
FIG. 6 shows a call flow diagram of an embodiment of the invention utilizing Caller-ID service.

Turning to another embodiment of the invention, in FIG. 4 the customer premises telephone was on-hook when the call was received from the dial-out voice server and the control data signal from the server was delivered utilizing suppressed ringing calls. FIG. 6 shows a message flow diagram in which the customer premises telephone is again on-hook when the call is received but now an on-hook Caller-ID service is utilized to deliver the control data signal. In this embodiment, the dial-out voice server initiates a telephone call as message 602. In an advantageous embodiment, the call may be initiated such that Caller-ID delivery is forced on every telephone line, even if Caller-ID is not currently assigned to the particular telephone line. Such a feature is similar to the Call Waiting Originating feature described above and may be accomplished, for example, by placing the calls on a dedicated telecommunications trunk that is specially provisioned to force Caller-ID delivery on every line (e.g., by calling a special DN or seizing a particular trunk). If Caller-ID is not forced, then, as will be seen from the following description, only those customer premises that utilize the Caller-ID service will be alerted with the voice message. After initiating the call, the switch sends message 604 to the customer premises. The message contains the first ring along with the Caller-ID information. This procedure is in accordance with well-known Caller-ID standards as set forth in Telcordia Technologies Generic Requirements GR-31-CORE Calling Number Delivery and GR-30-CORE. Upon receipt of message 604, the alerting device 304 (which is monitoring telephone line 306 as described above) determines whether the calling telephone number is a special number assigned to one or more of the dial out voice servers. In accordance with this embodiment, the alerting device 304 must be pre-programmed with the telephone numbers of the dial out voice servers so that the alerting device 304 can identify a call from one of the dial-out voice servers. Such numbers will be stored in memory 312 of the alerting device. If the call is not from one of the dial-out voice processors, then the call will pass to telephone 302 via port 310 for normal processing.

If the call is from one of the dial-out voice processors, then the alerting device goes off-hook (606) and an off-hook indication 608 is reported to the dial-out voice server. In response to receipt of indication 608, the dial-out voice server sends control data signal 610 via in-band signaling. The control data signal specifies a text parameter, a message ID parameter, an alarm control parameter, and a voice record control parameter. Upon receipt of the control data signal 610, the alerting device 304 decodes the message and displays the text message and activates appropriate alarms as described above. The display of the text message and the sounding of an audible alarm are represented in FIG. 6 by 612. Since the device is already off-hook, the dial-out voice server follows the control data signal 610 with the voice message 616 after a predetermined delay, and the alerting device plays and records (618) the voice announcement as described above. Since the voice message 616 follows the control data signal 610 by some predetermined delay, the audible alarm on the alerting device is also turned off after some predetermined delay as represented by 614.

Upon delivery of the voice message, the server sends the alerting device another control data signal 620. This control data signal 620 will instruct the alerting device to go on-hook, and adjust the alarm condition with its display of text, light, and/or sound. The device then goes on-hook (622), an indication (624) of which is forwarded to the dial-out voice server. Upon receipt of this on-hook indication 624 from the switch, the dial-out voice server disconnects and proceeds to its next call. The voice message is delivered and stored in the alerting device for later retrieval by the occupants, as illustrated by 626.

Figure 9:
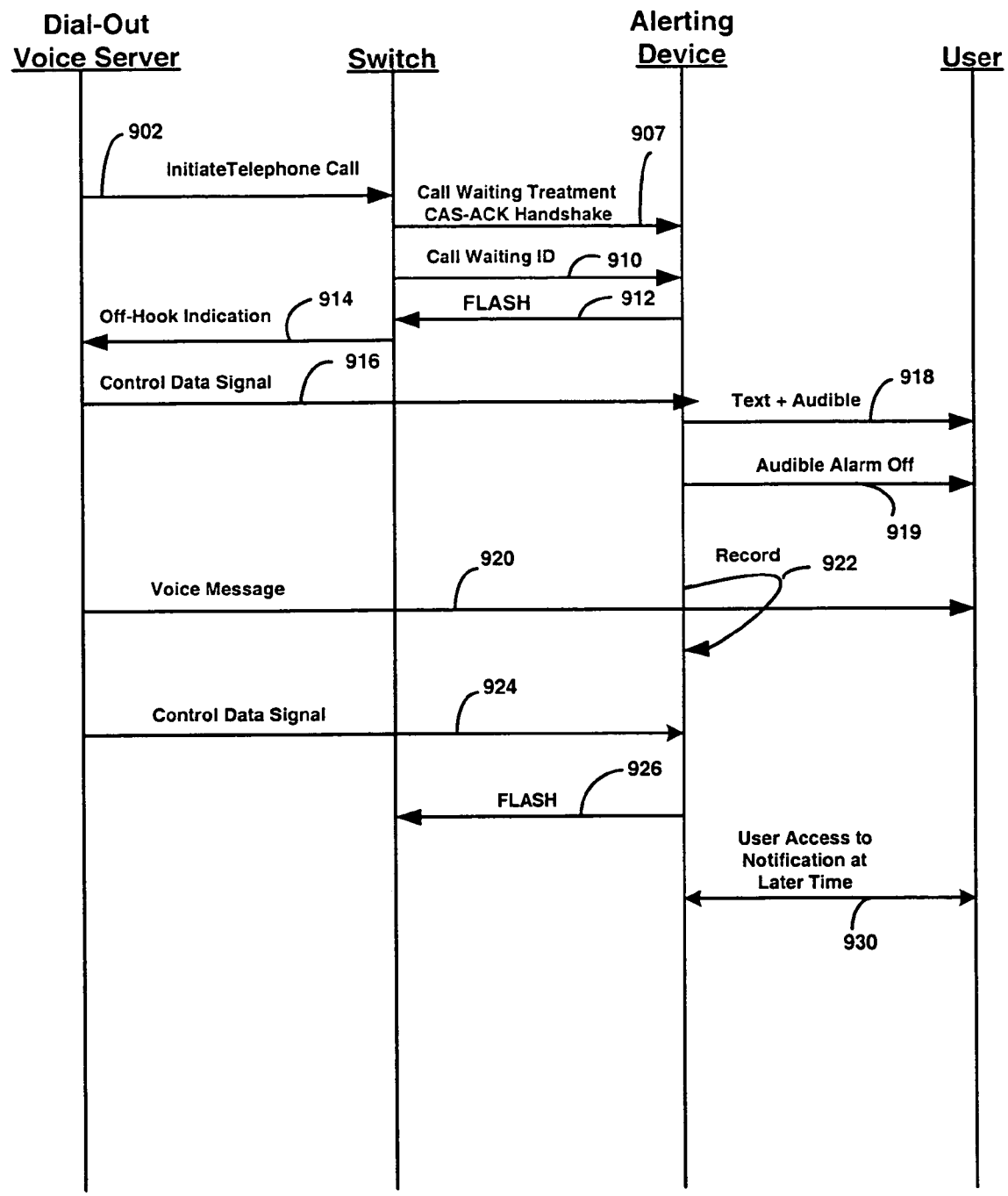
FIG. 9 shows a call flow diagram of an embodiment of the invention utilizing call waiting-ID service.

FIG. 6 illustrated a call flow diagram in which the customer premises telephone was on-hook and a Caller-ID service was utilized to deliver the control data signal. FIG. 9 illustrates a similar embodiment of the invention in which the customer premises telephone is now off-hook and the Call Waiting-Caller-ID service is utilized to deliver the control data signal. In this embodiment, the dial-out server forces the Call Waiting-Caller-ID service on every telephone line by initiating a telephone call 902 from a trunk that has Call-Waiting-Caller-ID originating capability assigned (e.g., by calling a special DN or seizing a particular trunk). The terminating switch applies call waiting treatment to the customer premises line and initiates the CAS-Acknowledgment handshake as indicated in 907. Following a successful handshake, the terminating switch sends the Caller-ID information of the dial-out server as indicated in 910. This procedure is in accordance with the well-known standard as set forth in Telcordia Technologies Calling Identity Delivery on Call Waiting (GR-575-CORE). Upon receipt of message 910, the alerting device 304 (which is monitoring telephone line 306 as described above) determines whether the calling telephone number is a special number assigned to one or more of the dial out voice servers. In accordance with this embodiment, the alerting device 304 must be pre-programmed with the telephone numbers of the dial out voice servers so that the alerting device 304 can identify a call from one of the dial-out voice servers. Such numbers will be stored in memory 312 of the alerting device. If the call waiting is not from one of the dial-out voice processors, then the call waiting will be passed to telephone 302 via port 310 for normal processing.

If the waiting call is from one of the dial-out voice processors and the alerting device recognizes the Caller-ID as such, the alerting device signals a FLASH, for example, in step 912 to cause the terminating switch to establish a voicepath between it and the dial-out voice server. Upon receiving an off-hook indication 914, the dial-out voice server sends a control data signal 916 via in-band signaling. The control data signal specifies a text parameter, a message ID parameter, an alarm control parameter, and a voice record control parameter. Upon receipt of the control data signal 916, the alerting device 304 decodes the message and displays the text message and activates appropriate alarms. The display of the text message and the sounding of an audible alarm are represented in FIG. 9 by 918. Since the device is already off-hook, the dial-out voice server follows the control data signal 916 with the voice message 920 after a predetermined delay, and the alerting device plays and records (922) the voice announcement as described above. Since the voice message 920 follows the control data signal 916 by some predetermined delay, the audible alarm on the alerting device is also turned off after some predetermined delay as represented by 919.

Upon delivery of the voice message, the server sends to the alerting device an in-band control data signal 924, disconnects and proceeds to its next call. In this embodiment, the server needs to disconnect after sending the control data signal 924, otherwise the call will remain in the held state of the Call Waiting feature. The control data signal 924 instructs the alerting devices to signal, for example, a FLASH to the switch, and adjust its alarm condition with its display of text, light, and/or sound. The device then signals the FLASH (926) and the switch re-establishes the previous call that was interrupted by the dial-out voice server call. The occupants at the customer premises may access the message at a later time as represented by 930.

Figure 7:
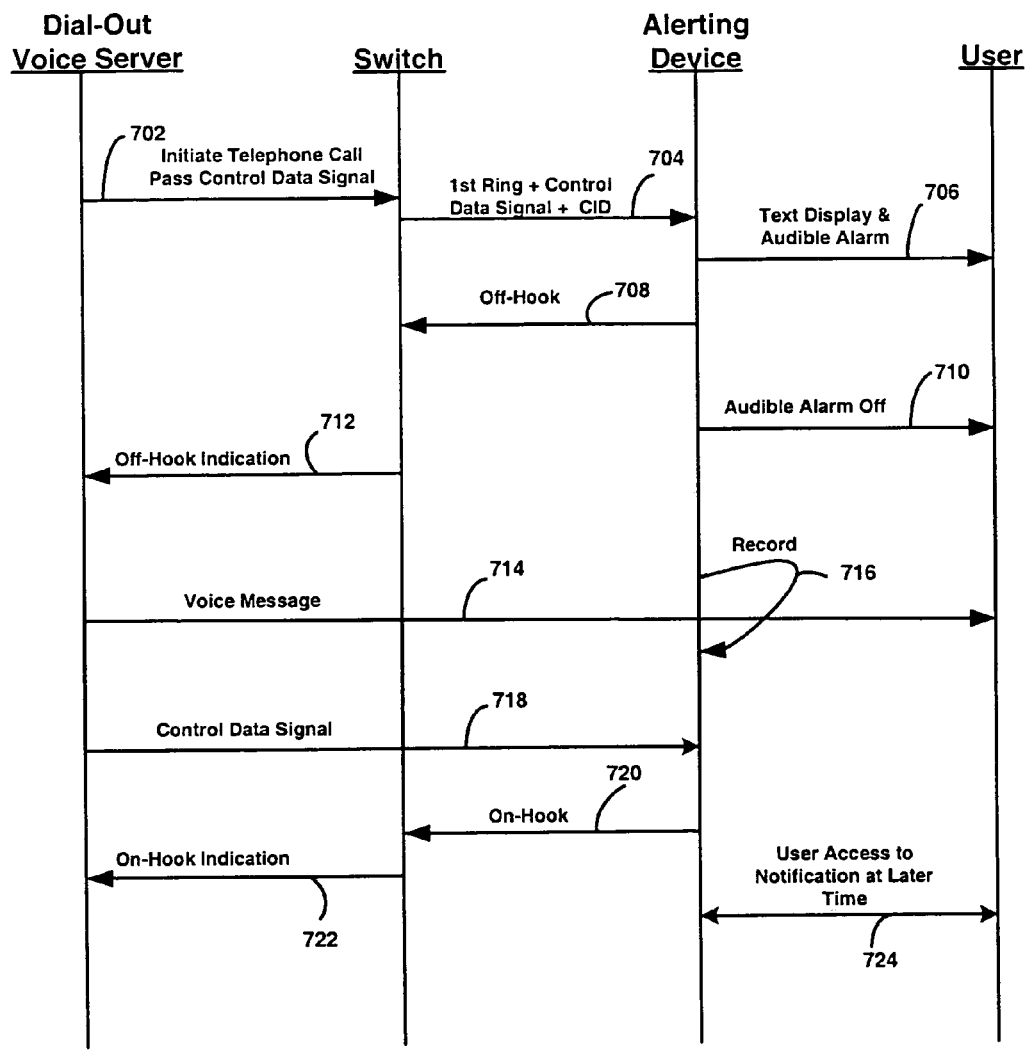
FIG. 7 shows a call flow diagram of another embodiment of the invention utilizing Caller-ID service.

FIG. 7 shows a message flow diagram of another embodiment of the invention in which the control data signal is sent in place of, or appended to, the on-hook Caller-ID information to circumvent the need to recognize special telephone numbers as that of the dial-out server. This embodiment is similar to the embodiment as depicted in FIG. 5 in that the dial-out voice server delivers the control data signal to the terminating switch, which then delivers the signal to the altering device (as compared to delivering the control signal directly to the alerting device through the voice channel). In particular, in accordance with this embodiment, the dial-out voice server instructs the terminating switch to replace the on-hook Caller-ID information with, or append to it, the control data signal as a parameter in the GR-30-CORE message used to deliver the standard Caller-ID information. First, the dial-out voice server sends control data signal 702 to the switch, using methods similar to those as described above in conjunction with message 506 of FIG. 5, with an indication that the control signal should replace, or be appended as a parameter in, the normal Caller-ID message that utilizes the on-hook data transmission protocol with power ringing. The switch transmits a first ring along with the control data signal and Caller-ID, if desired, as message 704. Upon receipt of the control data signal 704, the alerting device 304 decodes the message and displays the text message and Caller-ID if provided, and activates appropriate alarms as described above. The display of the text message and the sounding of an audible alarm are represented by 706.

While the alarm is sounding, the alerting device 304 goes off-hook as represented by 708. After going off-hook, the alerting device turns off its audible alarm (710) and waits for receipt of the voice message from the dial-out voice server. The switch sends an off-hook indication 712 to dial-out voice server indicating that the customer premises device has gone off-hook. Upon receipt of the off-hook indication 712 from the switch, the dial-out voice server transmits a voice message to the user via the voice path as represented by 714. The alerting device plays the voice message to occupants of the customer premises 300 via speaker 318. Also, if the voice record control parameter received in message 704 indicated that the alerting device should record the message, then the alerting device 304 records the voice message as represented by 716. The voice message may be recorded, for example, in memory 312 of the alerting device 304. The alerting device stores the voice message and associates it with the text message and any other event information for later retrieval by the occupants of the customer premises.

Upon delivery of the voice message, the server sends the alerting device an in-band control data signal 718. This control data signal 718 instructs the alerting device to go on-hook, and adjust its alarm condition with its display of text, light, and/or sound. The device then goes on-hook in step 720. Upon receipt of the on-hook indication 722 from the switch, the dial-out voice server disconnects and proceeds to its next call. The users at the customer premises may access the message at a later time as represented by 724. Note that using a similar call flow as depicted in FIG. 7 in combination with the Call Waiting-Caller-ID service, a control data signal can also be passed to a customer premises that is in the off-hook state.

Figure 8:
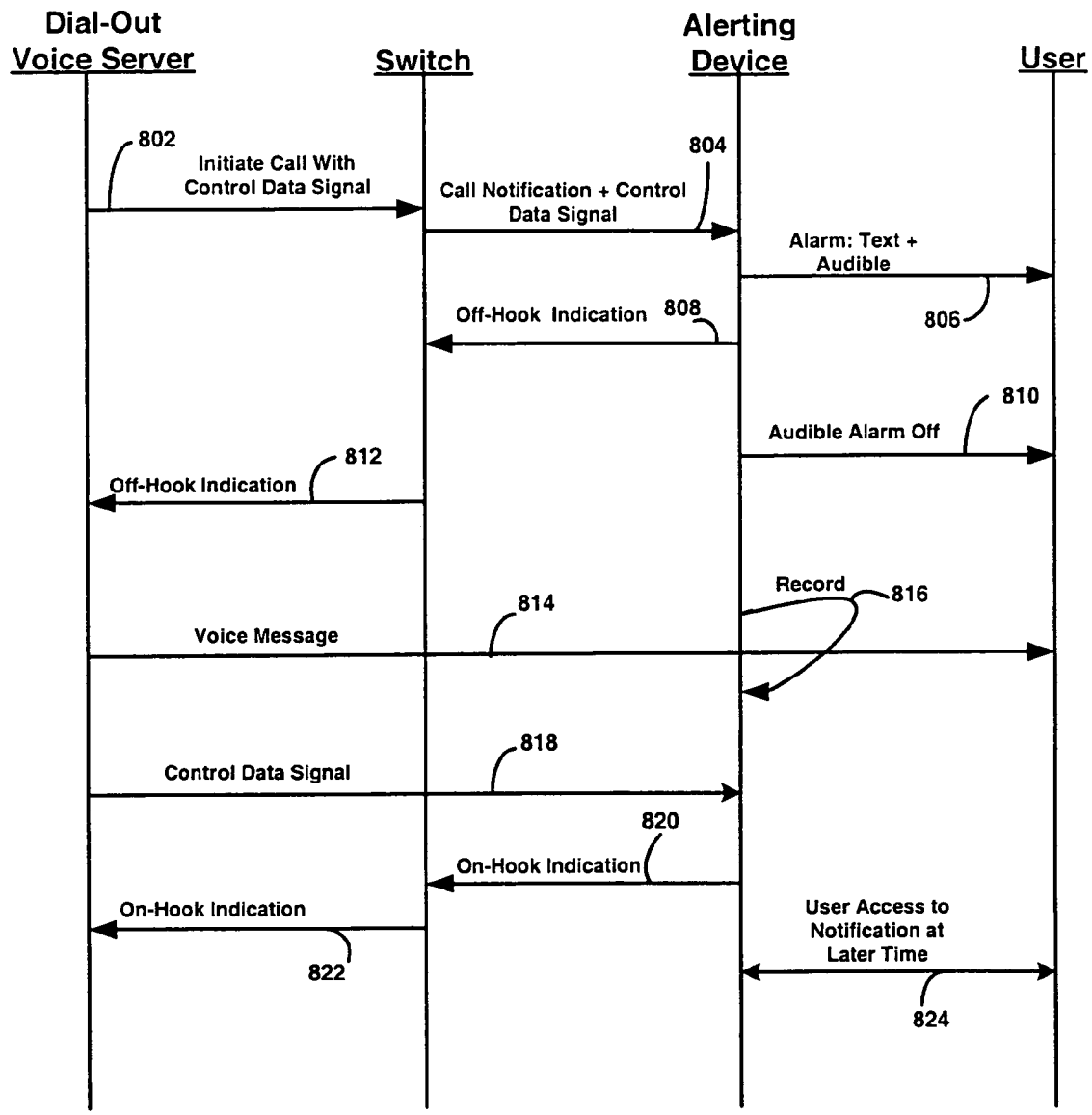
FIG. 8 shows a call flow diagram of an embodiment of the invention implemented in a wireless network.

FIG. 8 shows an embodiment in which the principles of the present invention are applied in a wireless telecommunications network in which a wireless telephone (or other wireless device) acts as the alerting device. For example, consider wireless network 120 (FIG. 1) in which a wireless telephone (e.g., 128, 130) acts as the alerting device (such a device would have functionality similar to that as shown in FIG. 3). In this embodiment, the wireless telephone is presumed to be on-hook and would be appropriately programmed to recognize a particular control data signal being broadcast on the wireless Forward Control Channel (FCC). In accordance with this embodiment, the dial-out voice server sends control data signal 802 to the switch (e.g., MSC 122) with an indication that the control signal should be sent to the wireless telephone using part of the call setup messaging in the Forward Control Channel. As is well known in wireless communications, the Forward Control Channel is used to allow the base station to broadcast information to the wireless telephones in its area. The wireless telephones continuously monitor this broadcast information on the control channel. In general, note that the server can send the control signal 802 to the switch (e.g., MSC 122) and instruct the switch on how to deliver the signal using methods similar to those as described above in reference to FIGS. 5 and 7. For example, the control data signal may be conveyed from the dial-out server to the originating switch (e.g., switch 106) via a FACILITIES message in an ISDN Primary Rate Interface (PRI) D channel. The control data signal may then be passed to the MSC via the Signaling System 7 (SS7) network.

The MSC switch transmits a call notification and control data signal 804 to the wireless telephone (e.g., telephone 128) via a radio base station (e.g. radio base station 124) in the Forward Control Channel. Upon receipt of the control data signal 804, the wireless telephone 128 decodes the message and displays the text message and activates appropriate alarms as described above. The display of the text message and the sounding of the audible alarm are represented by 806.

While the alarm is sounding, the wireless telephone 138 goes off-hook, (i.e., tunes to the proper frequency in a frequency division multiple access system, to a timeslot in the time division multiple access system, or to pseudo noise code in a code division multiple access system) and informs the MSC that it is ready via a message in the Reverse Control Channel as represented by off-hook indication 808. After going off-hook, the wireless telephone 128 turns off its audible alarm (810) and waits for receipt of the voice message from the dial-out voice server. The switch sends an indication 812 to the dial out voice server indicating that the wireless telephone has gone off-hook. Upon receipt of the off-hook indication 812 from the switch, the dial-out voice server transmits a voice message to the user via the voice path as represented by 814. The wireless telephone plays the voice message using speakerphone mode. Also, if the voice record control parameter received in message 804 indicated that the wireless telephone should record the message, then the wireless telephone records the voice message as represented by 816. The voice message may be recorded, for example, in a memory of the wireless telephone. The wireless telephone stores the voice message and associates it with the text message and any other event information for later retrieval by the user of the wireless telephone. Messages 818, 820, 822, 824 are similar to messages 718, 720, 722, 724 described above in conjunction with FIG. 7. The wireless embodiment described in conjunction with FIG. 8 may also optionally make use of the confirmation technique described above in reference to FIG. 4 whereby the wireless telephone may be configured to store the voice message and continuously display the visual and audible alarm until a user presses a confirmation button (e.g., an assigned button on the telephone keypad). Pressing the confirmation button turns off the alarm indicators and may send a short message (e.g., DTMF tone) to the dial-out voice server to confirm delivery either during the voice message delivery or post-delivery as described previously.

Since signaling information is sent in a separate control channel rather than in-band over a voice channel as in the wireline case, the message flow in FIG. 8 also applies if the wireless telephone happens to be off-hook when the control data signal is broadcast. After decoding the control data signal and activating its display and alarms, the wireless telephone would send a "FLASH" type signal to the MSC, causing the MSC to redirect the handset's current voicepath to the dial-out server so that the telephone could receive the voice message. Note that the message flow shown in FIG. 8 also applies in the call-waiting scenario.

Figure 10:
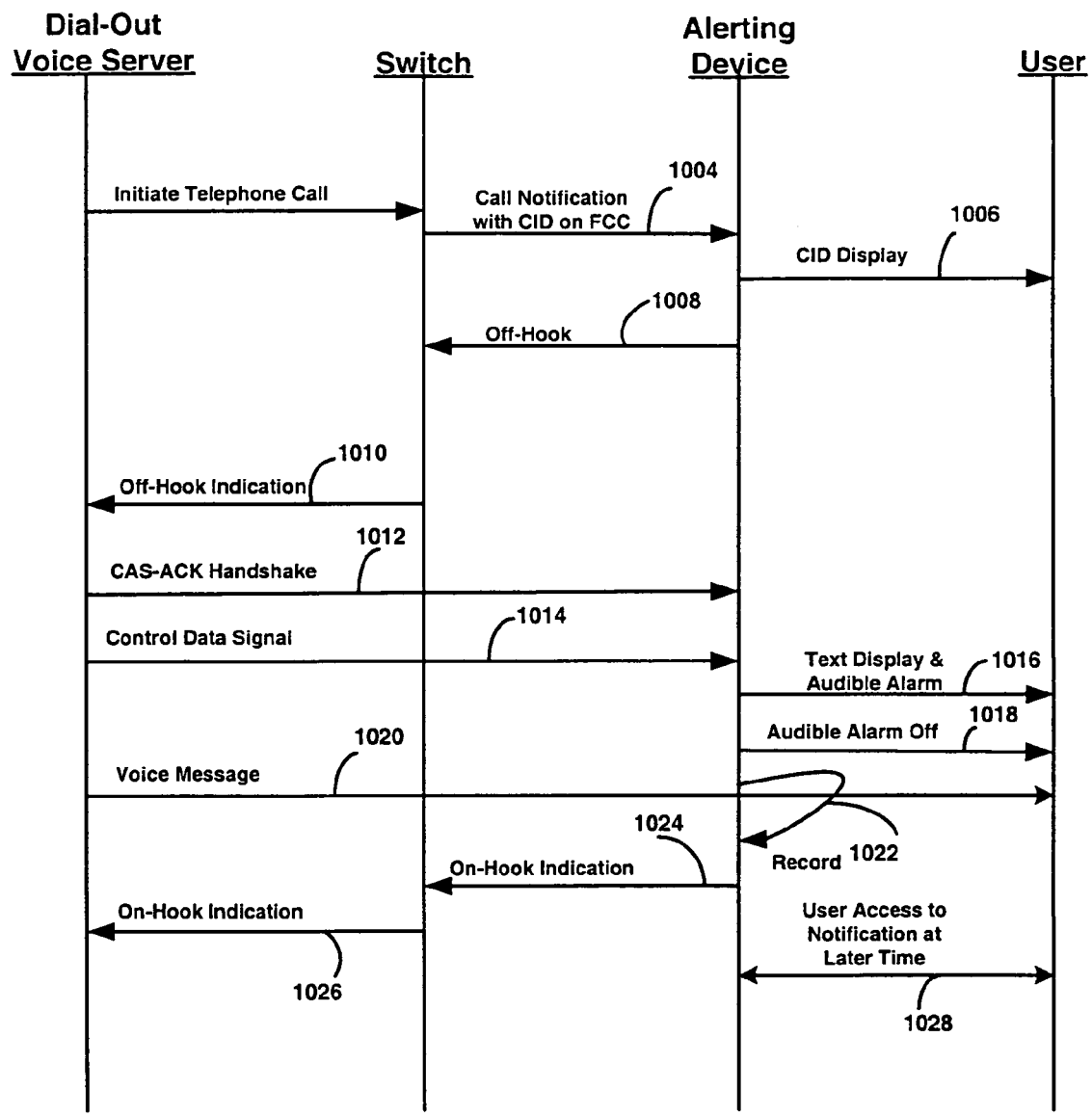
FIG. 10 shows a call flow diagram of an embodiment of the invention implemented in a wireless network and utilizing caller-ID service.

FIG. 10 illustrates an alternate embodiment for wireless telecommunications networks where the Caller-ID service is used instead of broadcasting the control data signal over the Forward Control Channel. This embodiment is similar to that shown in FIG. 6 in that the dial-out voice server initiates that call such that Caller-ID delivery is forced on the telephone line to the wireless telephone. Here, the switch (e.g., MSC 122) sends the Caller-ID information for the dial-out voice server as part of the call setup in the Forward Control Channel (FCC) as shown in 1004. In accordance with this embodiment, the wireless alerting device (e.g. 128, 130) must be pre-programmed with the telephone numbers of the dial out voice servers so that the wireless alerting device can identify a call from one of the dial-out voice servers. Such numbers will be stored in memory of the wireless alerting device. Upon decoding and recognizing the Caller-ID as that of a dial-out voice server, the wireless alerting device would display the Caller-ID (1006), tune to the proper wireless channel and go off-hook (1008). The switch informs the dial-out voice server that the wireless alerting device is ready through an off-hook indication 1010. Upon receiving indication 1010, the dial-out voice server initiates the CAS-Acknowledgment handshake 1012 with the wireless alerting device (in this case to trigger the alerting device to enter data mode). Upon a successful handshake, the dial-out voice server sends control data signal 1014 to the wireless alerting device. At the end of the control data signal, the wireless device reverts back to voice mode, decodes the control message, displays the text message and activates appropriate alarms as described above. The display of the text message and the sounding of the audible alarm are represented by 1016. In accordance with this embodiment, the wireless alerting device turns off its audible alarm after a pre-determined delay as illustrated in step 1018. The dial-out voice server then sends the voice message 1020 after waiting for a predetermined delay. The wireless telephone plays the voice message using speakerphone mode. Also, if the voice record control parameter received in message 1014 indicated that the wireless telephone should record the message, then the wireless telephone records the voice message as represented by 1022. The voice message may be recorded, for example, in a memory of the wireless telephone. The wireless telephone stores the voice message and associates it with the text message and any other event information for later retrieval by the user of the wireless telephone. The wireless telephone then sends an on-hook indication 1024 to the switch, and the switch sends a corresponding on-hook indication 1026 to the dial-out voice server. The user of the wireless telephone may access the message at a later time as represented by 1028. Again, note that using a similar call flow as depicted in FIG. 10 in combination with the Call Waiting-Caller-ID service, a control data signal can also be passed to a wireless telephone that is in the off-hook state.

The principles of the present invention may also be applied in a cable telecommunications network in which a wireline telephone or television acts as the alerting device. For example, consider cable network 132 (FIG. 1). It would be recognized by one skilled in the art that alerting device 144 connects to a telephone line equivalent to that provided by switch 112 but provided locally by set top box 138. Set top box 138 connects to voice gateway 134 through the cable network and more specifically communicates telephone voice and call control through one of several voice over packet protocols such as Data Over Cable Interface Specification (DOCSIS), Media Gateway Control Protocol (MGCP), or Session Initiation Protocol (SIP). Voice gateway 134 connects to the PSTN 110 using traditional voice trunks well known to those skilled in the art of telecommunications. Voice gateway 134 converts the traditional telecom trunk interface to a voice over packet protocol for transmission to set top box 138. Set top box 138, acting as a media gateway in the customer premises, converts the voice over packet protocol back to a traditional telephone line interface for the alerting device 144. In this manner, the conversion between the voice gateway 134 and set top box 138 becomes transparent to the dial-out voice server and alerting device. As such, the embodiments described herein in conjunction with FIGS. 4, 5, 6, 7, 9, and 11 would also apply to a cable network implementation. For the suppressed ringing embodiments of the present invention described in FIGS. 4 and 11, the voice gateway 134 needs to support the Suppressed Ringing Access feature described above. For the Caller-ID embodiments of the present invention described in FIGS. 6 and 9, voice gateway call processing for a dial-out server call is the same as for normal telephone calls. For the Caller-ID embodiments of the present invention described in FIGS. 5 and 7, the voice gateway 134 needs to support replacing or appending the control data signal to the Caller-ID message.

Figure 12:
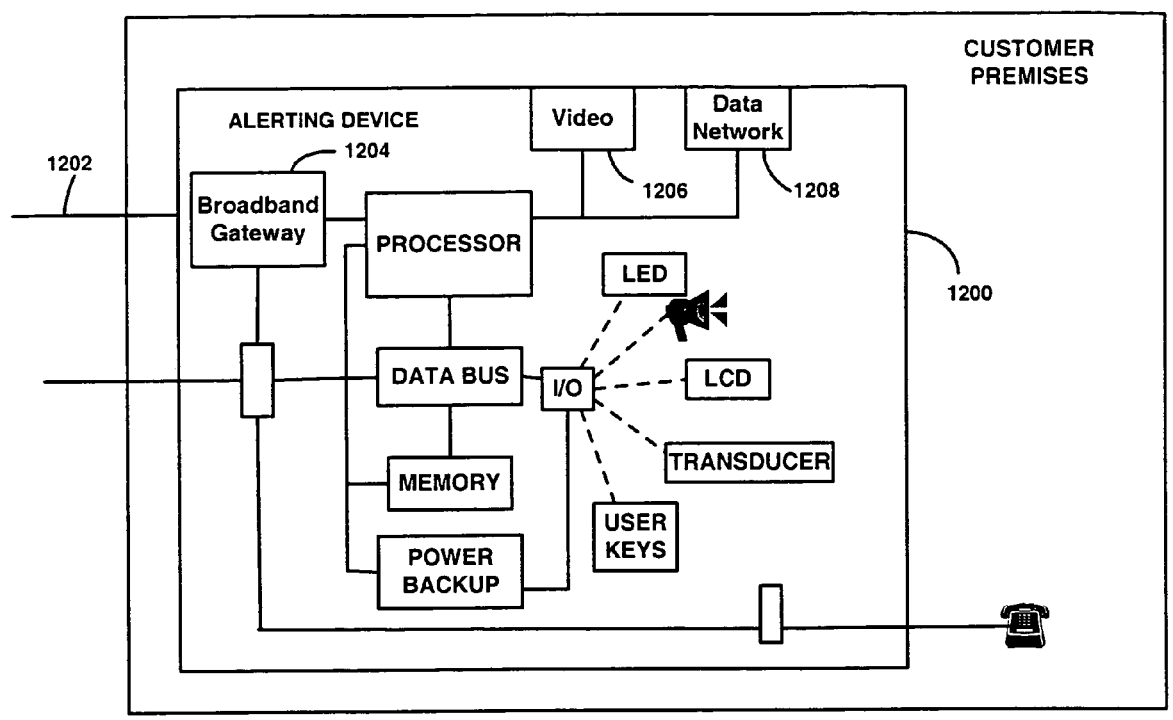
FIG. 12 shows a block diagram of an alerting device in accordance with the invention integrated with functionality of a set top box.

Those skilled in the art will recognize that the alerting device 144 can be integrated with functionality of set top box 138 as illustrated in FIG. 12, which shows an alerting device 1200 (similar to alerting device 304 of FIG. 3) having a broadband link 1202, a broadband gateway 1204 for access to telephone, video and data, a local video port 1206 and local network port 1208. Such integration makes possible additional methods for delivery of the control data signal content and voice message. The alerting device can be equipped with a television modulation circuit well known in the art to modulate the alarm signal and voice message into a television audio signal for play out on the current channel of television 140. The text content of the control data signal can be displayed on the television screen with the assistance of a text-to-NTSC converter, also well-known in the video industry. Likewise, the voice message can be converted by the alerting device to an alternate format, such as a WAV file, after decoding or decrypting and sent via an email message that the occupant can retrieve from computer 142. The text content of the control data signal can be inserted into the email body or header. Email transfer can be accomplished via the Simple Mail Transfer Protocol (SMTP) widely known and used in the art. Such email is sent from the alerting device over the cable network to a mail server 148. Computer 142 is used to retrieve this email using any of several commercially available email applications. Similarly, the voice message and text content of the control data signal can be converted and sent as an instant message that autonomously pops-up on the screen of computer 142, providing a visual display of the text and an icon that when clicked plays the voice message. The audible alarm functionality of the alerting device 144 can be accomplished by use of the computer sound capabilities.

Another advantage of the present invention is that it reduces the variability in call establishment times. A significant contributor to call establishment time with prior art dial-out voice systems is the time spent waiting for a person to answer the call. However, a system in accordance with the present invention does not have the call establishment variability because the customer premises alerting devices answer calls automatically. The call establishment time is reduced to a short, tightly bound interval because the alerting device responds to the data signal and takes control of the line almost immediately after decoding the data signal. As a result, calls made by a dial-out voice server to dialed numbers on the same terminating switch are likely to have very similar call establishment times. For example, consider dial-out voice server 104 placing a plurality of simultaneous calls to a plurality of customer premises (e.g., 114, 116) connected to terminating switch 112 via ports 108 and switch 106. Each of these simultaneous calls is likely to have a very similar call establishment time. This advantage of the dial-out voice server techniques of the present invention leads to another aspect of the present invention in which the voice message facilities of the dial-out voice server may be more efficiently utilized. Since many of the calls are expected to be answered at substantially the same time and since occupant interaction such as replay requests involve the alerting device and not the server, it is possible to share one voice message facility of the dial-out voice server among many calls. This aspect of the invention is illustrated with reference to FIG. 2. The output of single voice message facility 208 may be coupled to all ports (e.g., ports 214, 216, 218) that have received a connection receipt via internal switch 220. This allows for design of a dial-out voice server with less dedicated voice message facilities while still being able to service many simultaneous calls. If a particular port is late with its connection receipt, it may be queued for connection to the next voice message facility with the next block of connected calls.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention. For example, noting that analog voice messages are not necessarily the most efficient technique for transferring information when electronic equipment is available at both ends of a communication channel, the notification delivery may be further optimized as follows. Instead of playing an analog voice message, the dial-out voice server may compress a voice message using a standard vocoder (e.g., G.723.1) and send the compressed voice as a data message to the alerting device, either as part of the original data signal or otherwise. Further, while a landline telephone network, cable network and a wireless telephone network have been used to describe the various embodiments, the principles of the present invention may be implemented in other types of networks as well. In addition it should be recognized that the confirmation and authentication aspects of the invention described in conjunction with FIGS. 4 and 11 could be implemented in the other embodiments described herein even though not described in each of the message flow diagrams.

The invention claimed is:

1. A method, comprising:
    establishing a communication channel to each of a plurality of devices by initiating a communication with each of the plurality of devices;
    generating a first control data signal comprising first and second control parameters;
    transmitting the first control data signal to each of the plurality of devices, wherein the first control data signal is configured to cause a device of the plurality of devices to receive a voice message based on the first control parameter over the corresponding communication channel without user intervention and to cause the device to determine the received voice message is to be stored based on the second control parameter;
    transmitting the voice message to each of the plurality of devices; and
    transmitting a second control data signal to the plurality of devices, the second control data signal configured to cause the device to disconnect the communication channel.

2. The method of claim 1 wherein initiating the communication with each of the plurality of devices comprises initiating a plurality of suppressed ringing telephone calls to the plurality of devices, and
    wherein transmitting the first control data signal to each of the plurality of devices comprises transmitting the first control data signal to each device of the plurality of devices as an in-band data signal via the connection.

3. The method of claim 1 wherein initiating the communication with each of the plurality of devices comprises initiating a plurality of telephone calls wherein control data is signaled; and
    wherein transmitting the first control data signal to each of the plurality of devices comprises transmitting the first control data signal to each device of the plurality of devices as an in-band data signal via the connection.

4. The method of claim 1 wherein initiating the communication with each of the plurality of devices comprises initiating a plurality of telephone calls wherein control data is signaled; and
    wherein transmitting the first control data signal to each of the plurality of devices comprises transmitting the first control data signal over out of band control channels.

5. The method of claim 1 wherein the first control data signal is transmitted using on-hook data transmission in response to receipt of an indication that the communication channel to a device in the plurality of devices has been established.

6. The method of claim 1 wherein the first control data signal is embedded in an on-hook Caller-ID message.

7. The method of claim 1 wherein the first control data signal further comprises at least one of a text parameter, a message ID parameter, an alarm control parameter, and an authentication key code parameter.

8. The method of claim 1 wherein at least one communication of the plurality of communications is placed to an alerting device served by a packet-based network.

9. A method, comprising:
    monitoring a communications channel for a first control data signal at a device, the first control data signal comprising first and second control parameters;
    receiving the first control data signal;
    in response to the first control parameter, receiving over an established voice path a voice message while the device is in an on-hook state without user intervention;
    determining that the received voice message is to be stored in a memory of the device based on the second control parameter;
    monitoring the communications channel for a second control data signal; and
    in response to the second control data signal, disconnecting the device from the voice path.

10. The method of claim 9 further comprising: automatically displaying control data signal information; and initiating an alarm in response to receiving the first control data signal.

11. The method of claim 9 wherein receiving the first control data signal comprises:
receiving a suppressed ringing telephone call, and
receiving the first control data signal via in-band signaling.

12. The method of claim 9 wherein receiving the first control data signal comprises receiving the first control data signal via on-hook data transmission.

13. The method of claim 9 wherein receiving the first control data signal comprises receiving the first control data signal via an out of band control channel.

14. The method of claim 9 wherein the first control data signal is received via an on-hook caller-ID service.

15. The method of claim 9 wherein the first control data signal is received via an off-hook data transmission protocol.

16. The method of claim 9 further comprising: playing the voice message in response to receipt of a valid authentication key.

17. The method of claim 9 further comprising: transmitting a confirmation signal to confirm delivery of the voice message.

18. The method of claim 9 further comprising creating an email message containing control data information and the voice message.

19. The method of claim 9 further comprising: converting control data information from the first control data signal; and displaying the converted control data information.

20. An apparatus, comprising:
means for connecting the apparatus to a telecommunications network via a communications channel;
means for monitoring the communications channel for a first control data signal while the apparatus is in an on hook state, the first control data signal comprising first and second control parameters;
means for receiving the first control data signal;
means, in response to receipt of the first control parameter, for receiving over the communications channel a voice message while the apparatus is in the on hook state without user intervention;
means for determining that the received voice message is to be stored in the apparatus based on the second control parameter;
means for storing the received voice message, in response to determining the received voice message is to be stored;
means for monitoring the communications channel for a second control data signal; and
means, in response to receipt of the second control data signal, for disconnecting the communications channel without user intervention.

21. The apparatus of claim 20 wherein the means for receiving comprise means for receiving the first control data signal via on-hook data transmission.

22. The apparatus of claim 20 wherein the means for receiving comprise means for receiving the first control data signal via an out of band control channel.

23. The apparatus of claim 20 wherein the means for receiving comprise means for receiving and decoding on-hook caller-ID service.

24. The apparatus of claim 20 further comprising means for transmitting a confirmation signal to confirm delivery of the voice message.

25. The apparatus of claim 20 further comprising means for playing the voice message in response to receipt of a valid authentication key.

26. The apparatus of claim 20 further comprising means for converting information from the first control data signal and displaying text content of the first control data signal.

27. The apparatus of claim 20 wherein the apparatus is configured as a set top box and
wherein the communications channel is associated with a packet-based network.

28. A method, comprising:
establishing a communication channel to each of a plurality of devices;
transmitting a first control data signal to one or more of the plurality of devices using off-hook data transmission responsive to receipt of an indication from the network that the one or more of the plurality of devices has established the communication channel and is off-hook, the first control data signal comprising first and second control parameters, the first control data signal configured to cause a device of the plurality of devices to place a far end party on hold and to receive a voice message based on the first control parameter of the first control data signal without user intervention;
determining that the received voice message is to be stored in the device of the plurality of devices based on the second control parameter;
transmitting the voice message to each of the plurality of devices; and
transmitting a second control data signal via off-hook data transmission to the plurality of devices, the second control data signal configured to cause the device to restore the far end party from hold.

29. The method of claim 28 wherein the first control data signal is embedded in a call-waiting ID message.

30. A method, comprising:
monitoring a communications channel for a first control data signal broadcast to a plurality of devices;
receiving the first control data signal via off-hook data transmission at each of the plurality of devices;
in response to the first control data signal,
recognizing that an incoming call is for emergency notification,
placing a far end party on hold by a device of the plurality of devices based on a first control parameter of the first control data signal and without user intervention,
receiving a voice message,
determining the received voice message is to be stored in the device based on a second control parameter of the first control data signal, and
in response to determining the received voice message is to be stored, storing the received voice message;
monitoring the communications channel for a second control data signal sent via off-hook data transmission; and
in response to the second control data signal, reestablishing the a previous call when the far end party is on hold.

31. An apparatus, comprising:
means for establishing a communications channel;
means for monitoring the communications channel for a first control data signal at the apparatus indicating a voice message, the first control data signal comprising first and second control parameters;
means for receiving the first control data signal via off-hook data transmission;

means, in response to receipt of the first control parameter, for placing a current call on hold without user intervention;

means for receiving the voice message over a voice path;

means for determining the received voice message is to be stored in the apparatus based on the second control parameter;

means for storing the received voice message, in response to determining the received voice message is to be stored;

means for monitoring the communications channel for a second control data signal at the apparatus via off-hook data transmission; and means, in response to receipt of a control parameter of the second control data signal, for re-establishing a current call without user intervention.

32. The apparatus of claim 31 wherein the means for receiving comprise means for receiving and decoding off-hook caller-ID service.

* * * * *

UNITED STATES PATENT AND TRADEMARK OFFICE
CERTIFICATE OF CORRECTION

PATENT NO. : 7,844,035 B2  
APPLICATION NO. : 10/913572  
DATED : November 30, 2010  
INVENTOR(S) : Pietrowicz Page 1 of 1

It is certified that error appears in the above-identified patent and that said Letters Patent is hereby corrected as shown below:

Title page, item (56), under "Other Publications" in Column 2, Lines 4-5, delete "PCT/USO4/25411," and insert -- PCT/US04/25411, --.

Column 16, line 30, delete "telephone 138" and insert -- telephone 128 --.

Column 21, line 17, in Claim 14, delete "caller-ID" and insert -- Caller-ID --.

Column 21, lines 38-39, in Claim 20, delete "on hook" and insert -- on-hook --.

Column 21, line 45, in Claim 20, delete "on hook" and insert -- on-hook --.

Column 21, line 67, in Claim 23, delete "caller-ID" and insert -- Caller-ID --.

Column 22, line 59, in Claim 30, delete "the a" and insert -- a --.

Column 24, line 9, in Claim 32, delete "caller-ID" and insert -- Caller-ID --.

Signed and Sealed this  
Twenty-fourth Day of May, 2011

David J. Kappos  
*Director of the United States Patent and Trademark Office*